United States Patent [19]

Bordovsky et al.

[11] 4,064,789
[45] Dec. 27, 1977

[54] CONTROL VALVE FOR PRESSURE-MEDIUM SERVO-MOTOR

[75] Inventors: Jaromir Bordovsky, Leutenbach; Klaus Katz, Stuttgart, both of Germany

[73] Assignee: Daimler-Benz Aktiengesellschaft, Germany

[21] Appl. No.: 547,569

[22] Filed: Feb. 6, 1975

[30] Foreign Application Priority Data

Feb. 6, 1974 Germany .............................. 2405561

[51] Int. Cl.² ........................ F15B 15/17; F15B 13/14
[52] U.S. Cl. .................................... 91/417 R; 91/371; 91/373; 91/434
[58] Field of Search .................. 91/373, 372, 371, 370, 91/434, 417 R

[56] References Cited

U.S. PATENT DOCUMENTS

| 2,679,234 | 5/1954 | Robinson | 91/372 |
| 2,719,511 | 10/1955 | Presnell | 91/373 |
| 2,824,447 | 2/1958 | Garrison | 91/372 |
| 2,985,145 | 5/1961 | Foerster et al. | 91/373 |

FOREIGN PATENT DOCUMENTS

537,614   1/1956   Italy .................................. 91/372

*Primary Examiner*—Paul E. Maslousky
*Attorney, Agent, or Firm*—Craig & Antonelli

[57] ABSTRACT

A control valve for a pressure medium servo-motor of a servo-steering mechanism whose valve-adjusting member includes a reaction pressure surface that is immovable relative thereto and is adapted to be acted upon by the reaction pressure in a reaction pressure chamber connected exclusively to one of the two working pressure chambers of the working cylinder of the servo-motor; the valve-adjusting member is also connected with the reaction piston in such a manner as to enable a limited free relative adjusting path between the valve-adjusting member and the reaction piston; the reaction piston, in its turn, includes a reaction relief pressure surface which is adapted to be acted upon by the reaction pressure in a reaction pressure chamber connected exclusively to the same working pressure chamber and which is oppositely directed to the reaction pressure surface; the reaction piston is also supported with respect to the valve housing by means of a spring member which is under a prestress force while its reaction relief pressure surface is arranged in a reaction pressure chamber of the valve housing.

47 Claims, 20 Drawing Figures

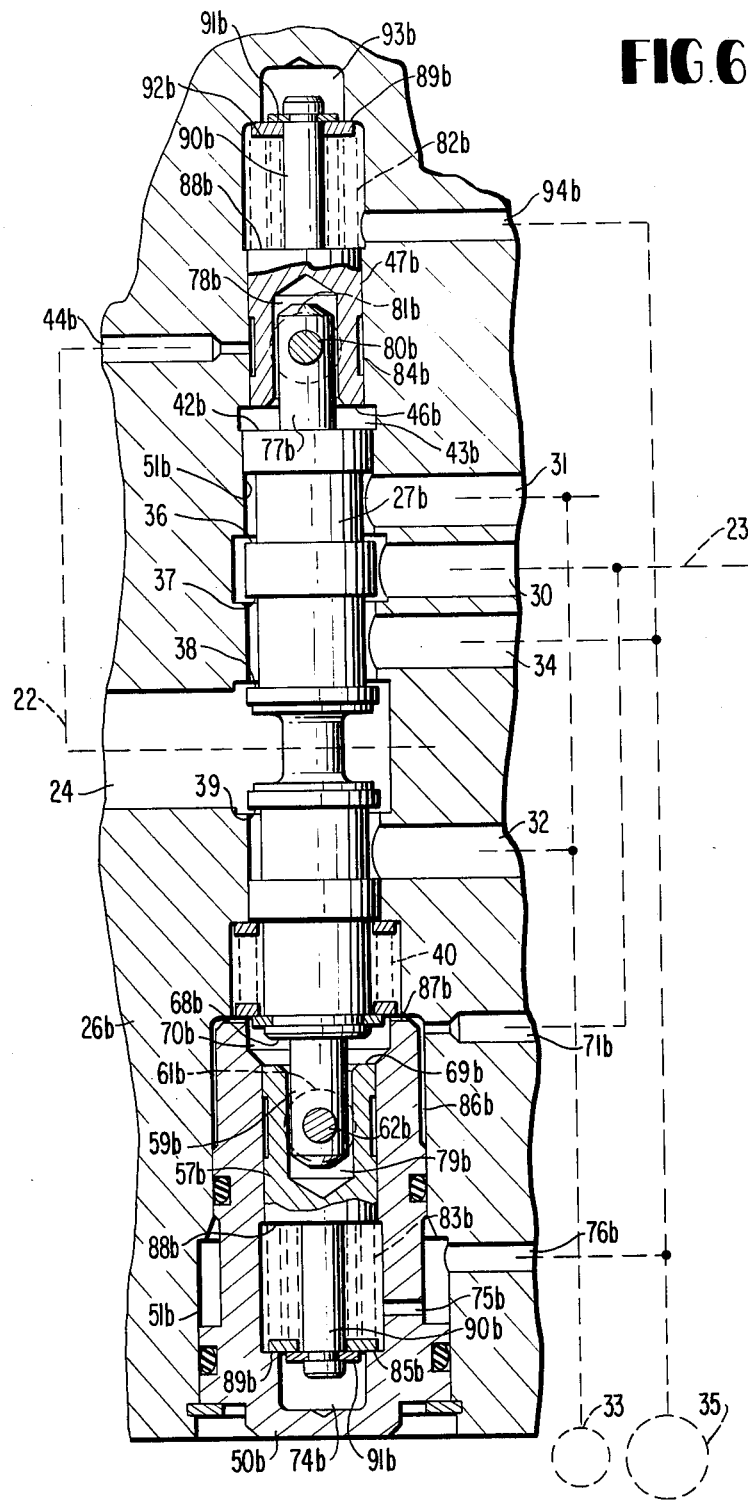

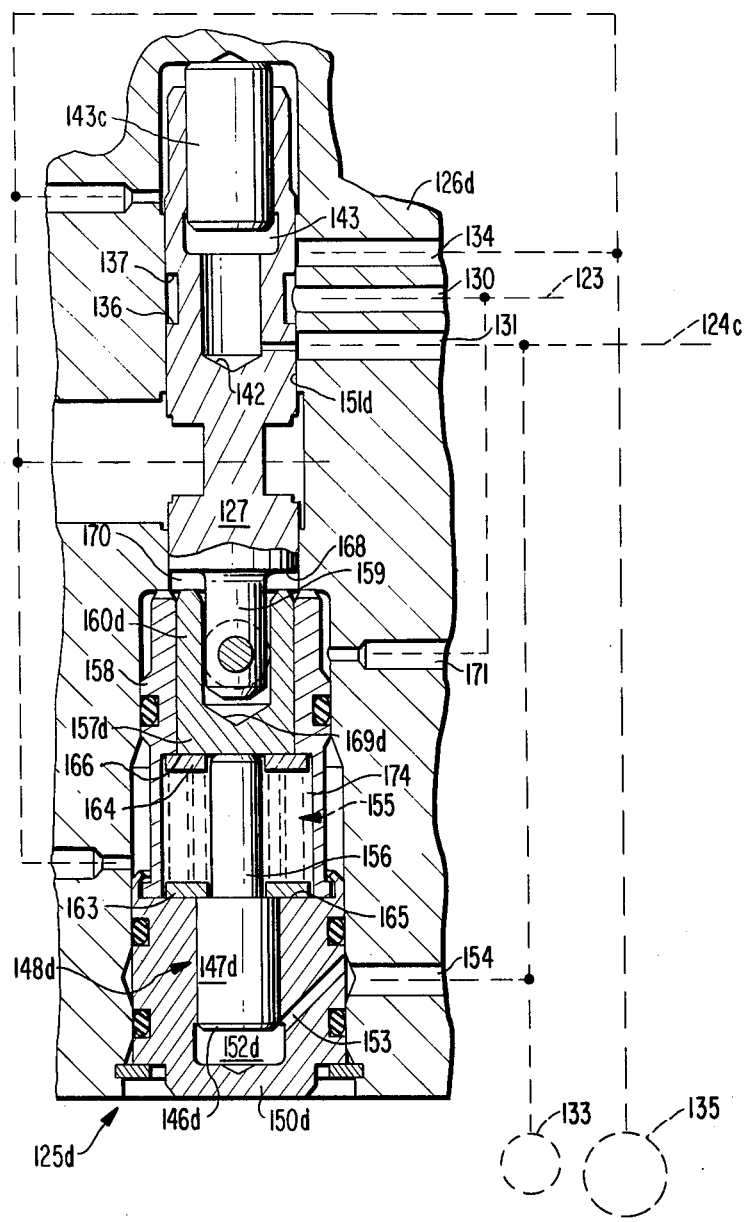

CONTROL VALVE FOR PRESSURE-MEDIUM SERVO-MOTOR

The present invention relates to a control valve for the pressure-medium servo-motor of a servo-steering system, whose valve adjusting member includes a reaction pressure surface immovable relative thereto and adapted to be acted upon by the reaction pressure in a reaction pressure chamber connected exclusively to one of the two working pressure chambers of the working cylinder of the servo-motor, and connected for limited movement with a reaction piston while enabling a limited, free relative-adjusting path between the valve adjusting member and the reaction piston, and in which the reaction piston includes a reaction relief pressure surface adapted to be acted upon by the reaction pressure in a reaction pressure chamber connected exclusively to the same working pressure chamber and disposed oppositely directed to the reaction pressure surface, and is supported with respect to the valve housing by means of a spring member subjected to a prestress force.

In a known control valve of this type (German Pat. No. 1,291,230) the valve adjusting member is provided with a reaction pressure chamber connected to the one working pressure chamber, in which operates a reaction piston adapted to be supported at the valve housing by way of a prestressed spring. As long as the reaction pressure in the reaction pressure chamber is smaller than the ratio of the spring prestress force to the reaction relief pressure surface, a reaction pressure force becomes effective at the reaction pressure surface of the valve adjusting member, which is noticeable at the steering wheel gearingly connected with the valve adjusting member, as manual force and is proportional to the load pressure in the working pressure chamber. If, in contrast thereto, the reaction pressure is larger than the ratio of the spring prestress force to the reaction relief pressure surface, then the reaction piston is rigid or fixed with respect to its reaction pressure chamber so that the reaction pressure force at the reaction pressure surface of the valve adjusting member is turned off and only the spring force of the spring member supporting the reaction piston with respect to the valve housing can be still detected as manual force at the steering wheel. With these prior art control valves, the ratio of the reaction pressure surface of the valve adjusting member to the reaction relief pressure surface of the reaction piston is necessarily equal to 1 so that in those cases, in which a manual force component proportional to the load pressure is still desirable also at higher load pressures, one has provided heretofore additional reaction pistons influenced by the load pressure of the same working pressure chamber which will produce a manual force component proportional to the load pressure also at higher load pressures (German Pat. No. 1,291,226 and British Pat. No. 781,980). In a prior art control valve with four-edge control (German Pat. No. 1,238,789) which by reason of the missing reaction pistons does not fall within the general type of classification of the present invention, the adjusting member, for purposes of repeating or checking back the load pressure in one working pressure chamber to the steering wheel, is provided with two reaction pressure surfaces disposed respectively in separate reaction pressure spaces each connected to the pressure medium inlet or feed as well as with an oppositely directed reaction relief pressure surface disposed in a reaction pressure chamber also connected to the pressure medium inlet or feed. The reaction pressure chamber of the one reaction pressure surface is adapted to be disconnected from the pressure medium feed or inlet at a predetermined magnitude of the reaction pressure by means of a pressure limit valve and is also to be adapted to be relieved of pressure at higher load pressures so that with a pressure-relieved reaction pressure chamber, the ratio of the reaction pressure surface of the reaction pressure chamber, which is not adapted to be disconnected, to the reaction relief pressure surface determines the further course or curve of the manual force as a function of the load pressure. If this ratio is equal to 1, then only a spring force becomes noticeable as manual force at higher load pressures. If the aforementioned area or surface ratio is larger or smaller than 1, then an increasing or decreasing progress or curve of a manual force component proportional to the load pressure will result which changes to a reduced extent with respect to the load pressure corresponding to the magnitude of the reaction pressure surface of the pressure-relieved reaction pressure chamber. It is disadvantageous with this prior art control valve that for purposes of changing the ratio of the reaction pressure surface or area to the reaction relief pressure surface or area, both the costly adjusting member provided with four control edges as also a housing sleeve provided with the corresponding counter control edges have to be interchanged.

The task underlying the present invention essentially consists in providing a control valve for the pressure-medium servo-motor of a servo-steering system, in which a change of the course or curve of the manual force as a function of the load pressure is made possible in a simple manner without having to provide additional reaction pistons or without having to exchange the valve adjusting member. A discontinuation of the manual force component proportional to the load pressure or a curve or course of this manual force component increasing or decreasing to a reduced extent beginning with a predetermined magnitude of the load pressure is to be attainable also in connection therewith.

As solution to this task, the present invention starts with a control valve of the aforementioned type having reaction pistons adapted to be disconnected and a valve adjusting member provided with a reaction pressure surface. According to the present invention, the underlying problems are solved in that the reaction relief pressure surface of the reaction piston is arranged in a reaction pressure chamber of the valve housing.

It is equally possible with the control valve according to the present invention to change the progress or curve of the manual force as a function of the load pressure by a change of the surface or area ratio of the reaction pressure surface to the reaction relief pressure surface. However, always the same valve adjusting member can be used for this purpose, while only the reaction piston or the reaction relief pressure surface thereof has to be exchanged or changed.

If the available structural length permits it, the reaction pressure surface and its associated reaction relief pressure surface may be located in a common reaction pressure chamber of the valve housing so that the valve adjusting member and the reaction piston are arranged in series.

If, however, a shorter structural length is aimed at, the arrangement may also be made in such a manner that the reaction pressure surface and its associated reaction relief pressure surface are disposed in different reaction pressure chambers. The valve adjusting member and the reaction pistons may thereby operate, for example, in parallel housing bores and may be mechanically connected with each other in any desired conventional manner for limited relative movement.

By reason of the compact construction required in servo-steering systems, one end of the valve adjusting member is frequently not accessible or accessible only with difficulty. In those cases, the control valve may be so constructed according to the present invention that the valve adjusting member is operatively connected for limited movement with a double-acting reaction-piston while enabling a limited free relative adjusting path between the valve adjusting member and the double-acting reaction-piston, and the double-acting reaction-piston is supported in both directions of its piston axis with respect to the valve housing by spring means subjected to a prestress force, and in that the double-acting reaction-piston includes two mutually opposite reaction relief pressure surfaces, whereby one reaction relief pressure surface is arranged in one reaction pressure chamber connected to one working pressure chamber and the other reaction relief pressure surface is arranged in a reaction pressure chamber connected to the other working pressure chamber and at least the reaction pressure chamber of the one reaction relief pressure surface is a part of the valve housing. Also, with such a control valve, one is independent in the arrangement of the reaction piston from the housing bore of the valve adjusting member, that is, the double-acting reaction-piston may operate in a housing bore parallel to but separate from the housing bore of the valve adjusting member and may be mechanically connected for limited movement with the valve adjusting member in any suitable conventional manner.

In order to keep small the structural expenditures in housing bores and pressure chambers and to be able to construct in a simple manner the mechanical connection between the valve adjusting member and the double-acting reaction-piston, the control valve according to the present invention may be so constructed that the axis of the double-acting reaction-piston is arranged coaxially to the axis of the valve adjusting member, and the reaction relief pressure surface adjacent the valve adjusting member and the reaction pressure surface adjacent the double-acting reaction-piston are disposed in a common reaction pressure chamber connected with the one working pressure chamber—whereas in contrast thereto, the reaction relief pressure surface opposite the valve adjusting member and the reaction pressure surface opposite the double-acting reaction-piston are disposed in separate reaction pressure chambers operatively connected each with the other working pressure chamber, of which at least the reaction pressure chamber of the reaction relief pressure surface forms a part of the valve housing.

If the control valve according to the present invention is to operate exclusively with a surface or area ratio of the reaction pressure surface to the reaction relief pressure surface equal to 1, i.e., with a disengagement of the manual force component proportional to the load pressure, then the common reaction pressure chamber may be a part of the valve adjusting member. On the other hand, the common reaction pressure chamber may also form a section of the housing control chamber for the valve adjusting member, whereby also in the last-mentioned construction, a disconnection or discontinuance of the manual force component proportional to the load pressure is, of course, attainable.

Since the double-acting reaction-piston represents a measuring and indicating installation for the amount and the sense of direction of the piston pressure force resulting at the working piston, the control valve according to the present invention having a double-acting reaction-piston may also be used for purposes of a two-edge control of the control pressure in the wide working pressure chamber of a servo-motor with a differential working piston whose narrow working pressure chamber is subjected to an essentially constant storage pressure, if the ratio of the reaction pressure surfaces of the valve adjusting member is equal to the ratio of the working pressure surfaces of the differential working piston. It is assured in this manner that the progress or curve of the manual force component proportional to the load pressure in the two directions of the steering deflection extends symmetrically to the equilibrium pressure value of the control pressure appertaining to the neutral position of the valve adjusting member for straight drive and the valve adjusting member automatically adjusts the equilibrium of the pressure forces at the differential working piston in case of deviations of the control pressure from this equilibrium pressure value or in case of fluctuations of the storage pressure. Since in the control valve according to the present invention, the reaction relief pressure surfaces are not located at the valve adjusting member, also with a two-edge control the ratio of the reaction pressure surface to the reaction relief pressure surface can be changed in order to attain, beginning with a predetermined magnitude of the load pressure, for example, a reduced increase of the manual force component proportional to the load pressure. If one thereby designs the ratio of the reaction relief pressure surfaces of the double-acting reaction-piston to be equal to the ratio of the working pressure surfaces of the differential working piston, then also the reduced increase of this manual force component is symmetrical in both directions of the steering deflection with respect to the equilibrium pressure value of the control pressure.

In the aforementioned prior art control valve with four-edge control and with a pressure limit valve (German Pat. No. 1,238,789), a change of the ratio of the reaction pressure surface to the reaction relief pressure surface necessarily produces a change of the ratio of the reaction pressure surfaces of the valve adjusting member since both surfaces are disposed at the valve adjusting member and the reaction relief pressure surface thus necessarily acts as the reaction pressure surface belonging to the other working pressure chamber, so that this known control valve is not suitable without any change for the principle of the two-edge control.

The known control valves with two-edge control (German Offenlegungsschrift 2,164,091) operate with a disengagement or turning-off of the manual force component porportional to the load pressure, however, they possess no reaction relief pressure surfaces so that the possibility does not exist with these prior art valves to impart to the manual force component proportional to the load pressure, beginning with a predetermined pressure magnitude, an increasing or decreasing characteristic which increases or decreases to a reduced extent. The disengagement or discontinuance of the manual force component proportional to the load pressure is achieved in these prior art control valves in that the one reaction pressure surface of the valve adjusting member adapted to be acted upon by the control pressure is provided at a reaction piston resiliently supported against the valve adjusting member, which reaction piston cooperates with fixed housing abutments. Fluctuations of the storage pressure or of the control pressure displace the point of disengagement or discontinuance of the load-dependent manual force component in control valve operating according to this principle.

In the control valve according to the present invention with a two-edge control, the arrangement may be made in such a manner that the common reaction pressure chamber for the valve adjusting member and the double-acting reaction-piston is connected to the relatively wide working pressure chamber. With this arrangement the larger reaction pressure surface of the valve adjusting member which is associated with the larger working pressure surface of the differential working piston, is disposed in the common reaction pressure chamber. A reaction pressure chamber in the valve housing or in the valve adjusting member then has to be provided for the smaller reaction pressure surface, whereby in the latter case a separate reaction piston for the determination of the size of the smaller reaction pressure surface is inserted into the reaction pressure chamber and is rigidly supported at the valve housing.

The control valve according to the present invention with a two-edge control, however, may also be so constructed that the common reaction pressure chamber for the valve adjusting member and the double-acting reaction-piston is connected with the relatively narrow working pressure chamber and is traversed by a connecting bolt whereby the cross section of the connecting bolt is smaller than the cross section of the common reaction pressure chamber, and that the connecting bolt is operatively connected with the double-acting reaction-piston in a pressure-resistant manner and also to be immovable relative thereto, whereas it is operatively connected with the valve adjusting member in a pressure-resistant manner and also to be limitedly movable relative thereto. With this control valve according to the present invention, the relatively smaller annular cross section between the housing bore for the valve adjusting member and the connecting bolt, which is smaller compared to the full cross section of this housing bore for the valve adjusting member, is coordinated to the smaller working pressure surface of the differential working piston.

In the control valve with a double-acting reaction-piston according to the present invention, it is of advantage if the double-acting reaction-piston includes two structurally separate piston sections adapted to be mutually axially supported with respect to each other and each piston section is provided with a reaction relief pressure surface. In this construction the individual piston sections may be centered separately in the respective reaction pressure chamber whereby the machining of the corresponding cylindrical sliding surfaces at the pistons and chamber is facilitated and alignment errors conditioned by manufacture and/or eccentricities of the piston sections can be compensated for.

A structurally advantageous accommodation of the springy means for the housing support of the reaction piston is attained for the control valve with double-acting reaction-piston according to the present invention in that a pressure-relieved chamber is provided between the reaction pressure chamber of the one reaction relief pressure surface and the reaction pressure chamber of the other reaction relief pressure surface, whereby the spring means for the housing support of the double-acting reaction-piston are arranged in the housing chamber. In application of this spring arrangement to a control valve with a double-acting reaction-piston according to the present invention provided with separate piston section, a structurally simple piston support is achieved in that the pressure-relieved housing chamber includes two spring abutments disposed at an axial spacing to one another, at which one spring end each of an axially compressible compression spring member is adapted to be supported, and in that the one piston section abuts at the one spring end and the other piston section at the other spring end.

Accordingly, it is an object of the present invention to provide a control valve for the pressure medium servo-motor of a servo-steering system which avoids by simple means the aforementioned shortcomings and drawbacks encountered in the prior art.

Another object of the present invention resides in a control valve for the pressure medium servo-motor of a servo-steering system which is relatively simple in construction, requires relatively few parts and eliminates the need for additional reaction pistons influenced by the load pressure.

A further object of the present invention resides in a control valve of the aforementioned type which enables a change in the control characteristics without the need for the exchange of several parts of the control system.

Still a further object of the present invention resides in a control valve for the pressure medium servo-motor of a servo-steering system in which a change of the curve of the manual force as a function of load pressure is possible without having to provide additional reaction pistons and/or exchange the valve adjusting member.

Still another object of the present invention resides in a control valve of the type described above in which the manual force component proportional to the load pressure can be increased or reduced to a predetermined reduced extent beginning with a predetermined magnitude of the load pressure without involving costly parts and complex structural modifications.

A further object of the present invention resides in a control valve assembly which is simple in construction and compact in physical dimensions, and which additionally permits easy manufacture and assembly of the various parts.

Another object of the present invention resides in a control valve for the pressure medium servo-motor of a servo-steering system which can be readily adapted for use with different control principles.

These and other objects, features and advantages of the present invention will become more apparent from the following description when taken in connection with the accompanying drawing which shows, for purposes of illustration only, several embodiments in accordance with the present invention and wherein:

FIG. 6 is a partial cross-sectional view, again corresponding to FIG. 1 but at an enlarged scale with respect thereto, through a third embodiment of a control valve according to the present invention with a four-edge control;

FIG. 13 is a partial cross-sectional view through a fifth embodiment of the control valve according to the present invention with a two-edge control, in a partial cross-sectional view through a servo-steering mechanism corresponding to FIG. 8 but on an enlarged scale;

Figures 16, 18:
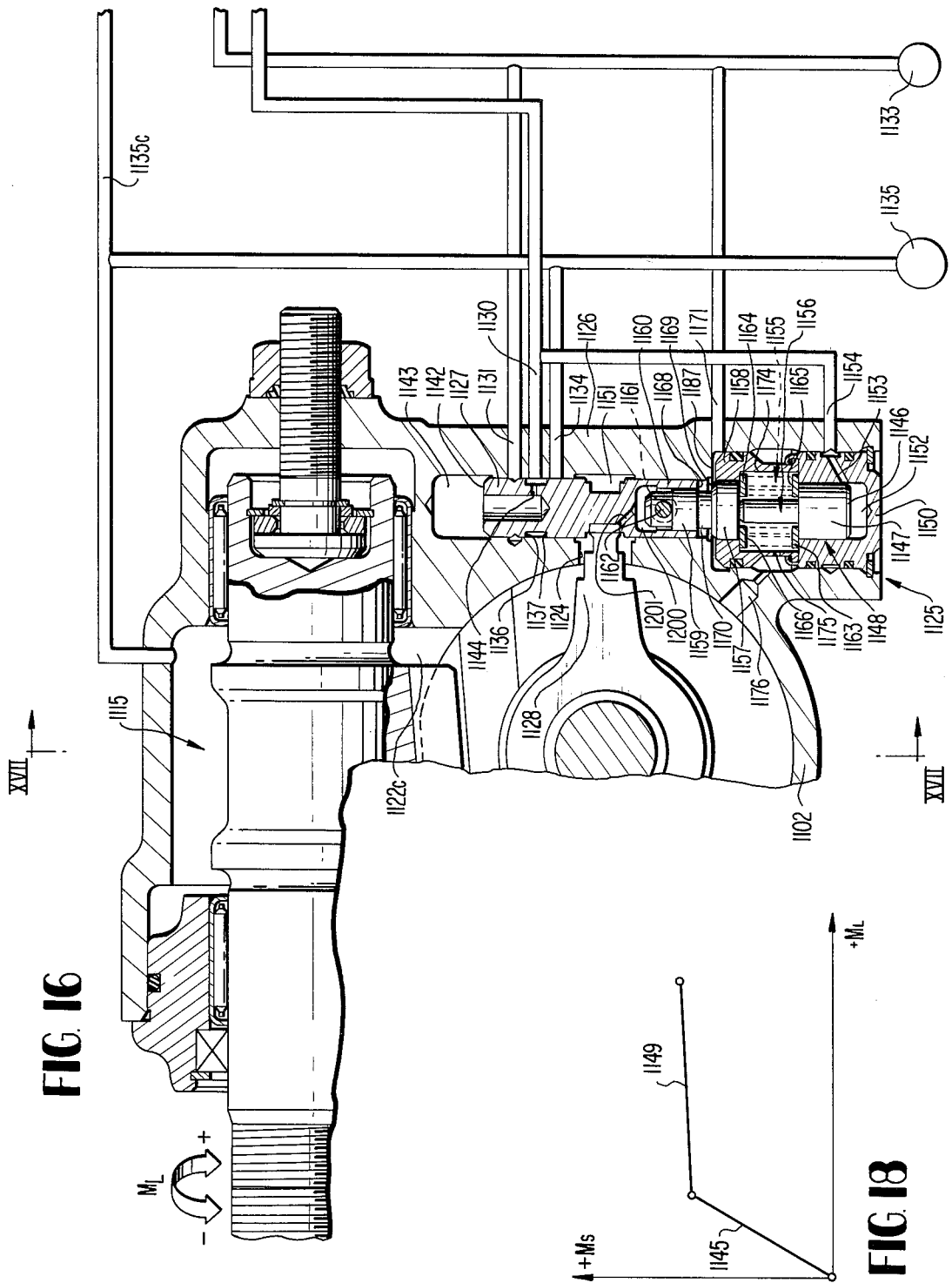
FIG. 16 is a partial cross-sectional view through a servo-steering mechanism with a differential working piston and with a seventh embodiment of a control valve according to the present invention having a two-edge control, taken along line XVI—XVI of FIG. 17 and illustrating the various parts at least approximately in their actual dimensions.
FIG. 18 is a diagram illustrating the curve of the steering moment $M_S$ at the steering worm as a function of the steering shaft moment $M_L$ in connection with the seventh embodiment of the control valve according to the present invention as illustrated in FIGS. 16 and 17.
Figure 19:
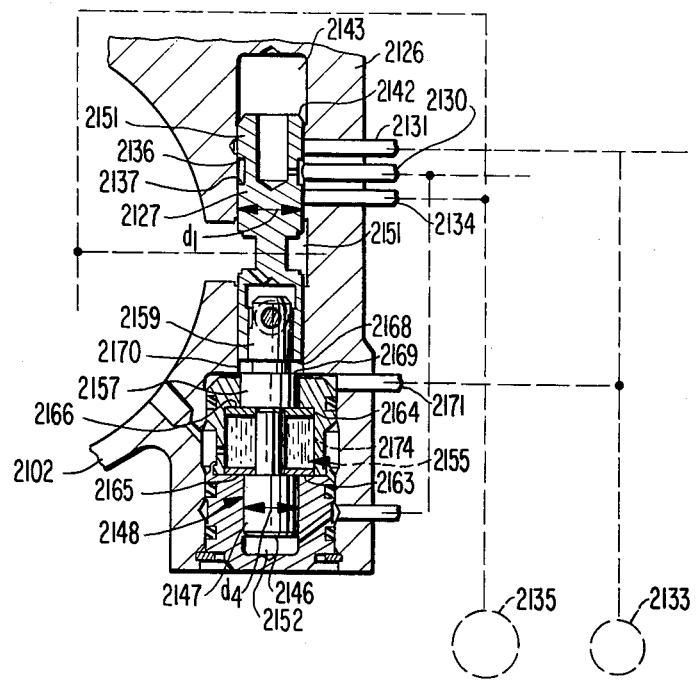
Figure 20:
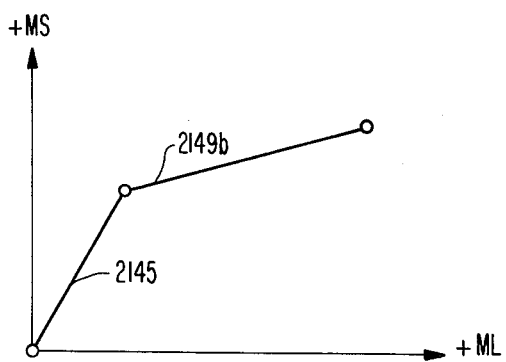

FIG. 19 is a partial cross-sectional view through an eighth embodiment of a control valve according to the present invention with a two-edge control, in a partial cross-section through a servo-steering mechanism corresponding to FIG. 16 and showing the parts at least approximately in their actual dimensions; and FIG. 20 is a diagram illustrating the curve of the steering moment $M_S$ at the steering worm as a function of the steering shaft moment $M_L$ in connection with the control valve of FIG. 19.

Referring now to the drawing wherein like reference numerals are used throughout the various views to designate like parts, at first the construction and operation of the servo-steering mechanism according to FIGS. 1 and 2, which operates according to the principle of the four-edge control will be described:

A steering spindle member 3 is rotatably and axially immovably supported in a housing end cover 1 (FIG. 2) of a steering gear housing 2 constructed as pressure medium-working cylinder by means of a bearing arrangement generally designated by reference numeral 4. The steering spindle member 3 is provided at its end outside of the housing with a coupling pin 5, by way of which it can be connected with the steering wheel (not shown). At its end on the inside of the housing, the steering spindle member 3 includes a steering worm 6 (FIG. 2) fixed or secured for rotation in unison therewith, which is spirally movably connected with a steering nut 8 by means of a conventional ball circulation generally designated by reference numeral 7. The steering nut 8 is rotatably but axially non-displaceably supported by means of two bearing arrangements generally designated by reference numerals 9 and 10 in a working piston generally designated by reference numeral 11 which is displaceably guided within the steering gear housing 2. The working piston 11 is provided at its circumference with a toothed rack profile 12, into which engages a toothed segment 13 of a steering shaft rotatably supported in a housing bulge 14 of the steering gear housing 2, whereby the steering shaft 15 is adapted to be connected in a known manner with the steered vehicle wheels (not shown). The working piston 11 which is essentially ring or annular shape in cross-section, is sealed off at its outer circumference by an annular seal 16 (FIG. 2) with respect to the cylinder surface 17 of the steering gear housing 2 and at its inner circumference by an annular seal 18 with respect to a sealing sleeve 19, which is unitary or in one piece with the housing end cover 1 and whose concentric bore 20 serves for the passage of the steering spindle member 3 into the interior space of the steering gear housing 2. This interior space is subdivided by the working piston 11 into two working pressure chambers 21 and 22 which are operatively connected with a control valve generally designated by reference numeral 25 (FIG. 1) by way of a housing channel schematically indicated at 23 and by way of a housing channel 24; the valve housing 26 of the control valve 25 is in one piece, i.e., unitary with the steering gear housing 2. As is ordinarily customary in connection with the principle of the four-edge control, the two effective working pressure surfaces of the working piston 11 which are acted upon respectively by the pressure of a respective working pressure chamber 21 and 22, are of equal size. The effective cross section of these working pressure surfaces is equal to the annular cross section of the working piston 11 limited by the cylinder surface 17 and the outer circumference of the sealing sleeve 19.

The circumferential force resulting at the steering nut 8 from the spiral connection thereof with the steering worm 6 is used for the actuation of the valve adjusting member 27 of the control valve 25, constructed as control slide member, in dependence on the steering deflection of the steering wheel or of the steering spindle member 3. For this purpose, the steering nut 8 is provided with a radial control bar 28 which extends with play through the housing channel 24 and engages form-lockingly but pivotally or jointedly in an annular groove 29 of the valve adjusting member 27. The housing channel 24 forms the valve connection or port of the control valve 25 for the one working pressure chamber 22, whereas the housing channel 23 of the other working pressure chamber 21 is connected with a further valve connection or port 30 of the control valve 25. Two other valve connections or ports 31 and 32 of the control valve 25 are connected with a pressure line schematically indicated at 33 of a pressure pump (not shown) which supplies continuously, whereas a last valve connection or port 34 of the control valve 25 is connected with a pressure-relieved return line schematically indicated at 35. The valve adjusting member 27 is provided with four control edges 36 to 39 and is centered in its neutral position as shown and corresponding to the position of the steering wheel for a straight drive with respect to the valve housing 26 by a base load spring 40. The two control edges 36 and 37 control the pressure medium connection between the valve connection 30 of the one working pressure chamber 21, on the one hand, and the two adjacent valve connections 31 and 34 of the pressure line 33 and of the return line 35, on the other—whereas the two control edges 38 and 39 control the pressure medium connection between the valve connection or housing channel 24 of the other working pressure chamber 22, on the one hand, and the adjacent valve connections 32 and 34 of the pressure line 33 and of the return line 35, respectively. In the neutral position of the valve adjusting member 27 the valve connections 31 and 32 of the pressure line 33 are by-passed to the valve connection 34 of the return line 35 so that the pressure medium supplied by the pressure pump is again fed to the suction side of the pressure pump throttled only slightly by way of the return line 35.

Figure 2:
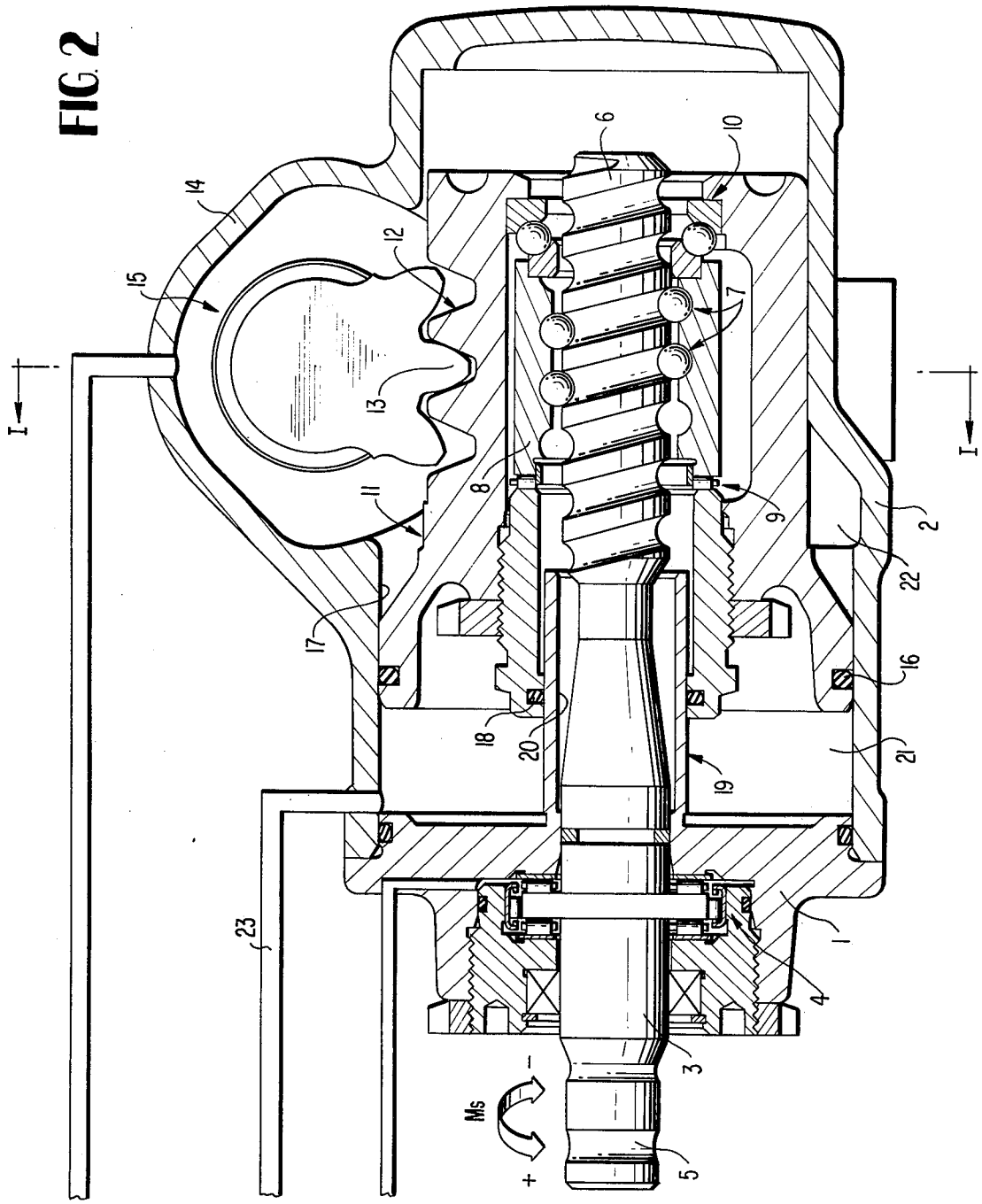
FIG. 2 is an axial cross-sectional view through the servo-steering mechanism according to the present invention, taken along line II—II of FIG. 1, and again illustrating the same at least approximately in its actual dimensions.
Figure 3:
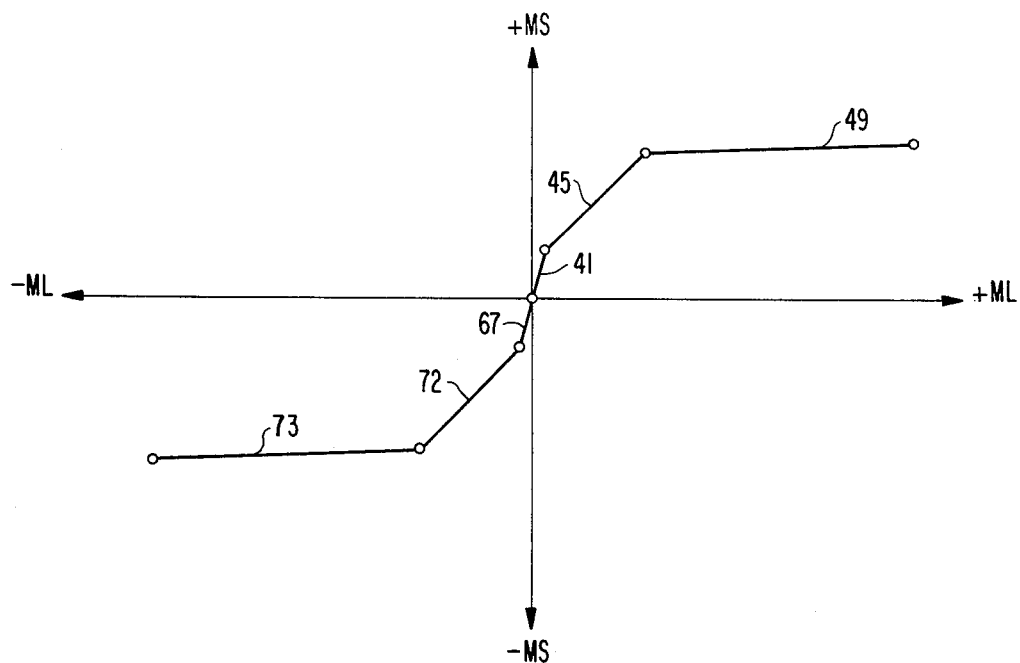
FIG. 3 is a diagram illustrating the curve of the steering moment $M_S$ at the steering worm which is to be applied manually as a function of the steering shaft moment $M_L$ introduced from the steering shaft into the vehicle wheels in connection with the first embodiment of the control valve according to the present invention as illustrated in FIGS. 1 and 2.

With a right-hand deflection of the steering wheel corresponding to the positive directional sense of the directional arrow $M_S$, shown within the area of the coupling pin 5 in FIG. 2, for the torque manually applied at the steering worm 6, both an axial force directed toward the coupling pin 5 as also a circumferential force directed in the positive sense of the directional arrow $M_S$ result respectively from this torque at the steering nut 8, which seek to displace the control bar 28 and therewith the valve adjusting member 27 in the direction toward the steering shaft 15 out of the illustrated neutral position. As long as the prestress force of the base-load spring 40 maintains the equilibrium to this circumferential force, the valve adjusting member 27 is rigidly supported at the valve housing 26 so that the two working pressure chambers 21 and 22 are essentially pressureless and the described axial force at the steering nut 8 amounts to 100% as manual force component in the piston force of the working piston 11. This so-called mechanical range of the course or curve of the manual force at the steering wheel or of the torque $M_S$ of the steering worm 6 as a function of the steering shaft moment $M_L$ is represented in FIG. 3 by the curve section 41. If the prestress force of the base-load spring 40 is overcome by the circumferential force of the steering nut 8 during a right-hand deflection, then the valve adjusting member 27 moves in the direction toward the steering shaft 15 whereby the respective pressure medium connection between the valve connections 31 and 30 as well as between the valve connections 24 and 34 is throttled by way of the control edges 36 and 38 and the respective pressure medium connection between the valve connections 30 and 34 as well as between the valve connections 24 and 32 is valved to be further opened by way of the control edges 37 and 39. In this manner a higher pressure will establish itself in the working pressure chamber 22 than in the working pressure chamber 21, from which will result a piston pressure force at the working piston 11 which is directed in the same direction as the manually applied axial force at the steering nut 8. At its end adjacent the steering shaft 15, the valve adjusting member 27 is provided with a reaction pressure surface 42 which is acted upon by the reaction pressure in a reaction pressure chamber 43 of the valve housing. This reaction pressure chamber 43 is connected by way of a housing channel 44 with the working pressure chamber 22 so that a reaction pressure force proportional to the working pressure in the working pressure chamber 22 acts on the valve adjusting member 27 by way of its reaction pressure surface 42, which is noticeable at the steering wheel as a pressure-dependent manual force component by reason of the gearing-like connection of the valve adjusting member 27 with the steering worm 6. This so-called proportional range of the curve of the manual force or of the manually applied torque $M_S$ at the steering shaft 6 as a function of the steering shaft moment $M_L$ is represented in FIG. 3 by the curve section 45. If the working pressure in the working pressure chamber 22 increases above a predetermined value during a right-hand deflection or turning of the steering wheel, then a reaction relief pressure force of a reaction relief pressure surface 46, which acts opposite the reaction pressure force of the reaction pressure surface 42, at a piston section 47 of a double-acting reaction-piston generally designated by reference numeral 48 becomes effective at the valve adjusting member 27 in order to limit the manual force at high working pressures. The so-called range of the manual force limitation of the curve of the manual force or of the torque $M_S$ to be manually applied at the steering worm 6 as a function of the steering shaft moment $M_L$ is indicated in FIG. 3 by the curve section 49. The piston section 47 is axially displaceably guided in a pot-shaped cylinder bushing or sleeve 50 which is inserted into a housing bore 51 of the valve housing 26 for the valve adjusting member 27 and is immovably fixed with respect to the latter. The reaction relief pressure surface 46 is located in a reaction pressure chamber 52 of the cylinder sleeve 50, which is connected by way of a bore 53 of the cylinder sleeve 50 and by way of a housing channel 54 of the steering gear housing 2 communicating with this bore 53, with the same working pressure chamber 22 as the reaction pressure chamber 43 of the reaction pressure surface 42. At its end opposite the reaction relief pressure surface 46, the piston section 47 is supported both at a reaction spring member 55 as well as at a second piston section 57 of the reaction piston 48 by means of a spacer pin 56. The piston section 57 is axially displaceably guided in a second cylinder bushing or sleeve 58 and is provided at its end facing the valve adjusting member 27 with a concentric coupling pin 59 which projects with radial play into a fixed concentric coupling bushing or sleeve 60 of the valve adjusting member 27. The limited axially movable connection of the coupling pin 59 by means of a cross pin 62 engaging with play in radial bores 61 of the coupling sleeve 60 corresponds to the arrangement which can be seen from FIG. 10 and will be described more fully hereinafter. The reaction spring member 55 consists of two concentric coil springs, at the ends of which abut respectively one abutment ring disk 63 and 64 each which, in turn, are supported at abutment edges 65 and 66 of the two cylinder sleeves 50 and 58 and are traversed with radial play by the spacer pin 56. The cylinder sleeve 58 is also inserted into the housing bore 51 and is immovably fixed with respect to the valve housing 26, whereby the end of this sleeve 58 which faces the valve adjusting member 27 serves as abutment for the base-load spring 40. If during the right-hand turning or deflection of the steering wheel, the reaction pressure in the reaction pressure chamber 52 becomes larger than the ratio of the prestress force of the reaction spring member 55 to the reaction relief pressure surface 46, then the piston section 47 together with the abutment ring disk 63 moves in the direction toward the steering shaft 15 whereby the cross pin 62 is brought into abutment at the wall of the bore 61 by means of the spacer pin 56 and as a result thereof a reaction relief pressure force reduced by the spring force of the reaction spring member 55 is exerted on the valve adjusting member 27. This means, if the ratio of the reaction pressure surface 42 to the reaction relief pressure surface 46 is equal to 1 as with the illustrated control valve 25, only the spring force of the reaction spring member 55 becomes noticeable at the steering wheel as manual force within the range 49 of the manual force limitation—apart from the effect of the base-load spring 40.

According to the present invention, the reaction relief pressure surface 46 of the piston section 47 is located in a reaction pressure chamber 52 of the valve housing 26—the cylinder sleeve 50 is thereby to be considered as rigid part of the valve housing 26. By replacing the piston section 47 with a piston section having a smaller or a larger reaction relief pressure surface and of the cylinder sleeve 50 with a cylinder sleeve having a narrower or wider cylinder bore, it is possible in a simple manner to make the ratio of the surfaces 42 and 46 non-equal to 1 in order to attain a more steep or more dropping off progress or configuration of the curve section 49. It is thereby of advantage that the piston section 47 may be arranged, for example, also parallel to the valve adjusting member 27 and may be mechanically connected with the latter to provide limited movement in any suitable known manner. A further advantage of the arrangement according to the present invention of the reaction relief pressure surface 46 in a reaction pressure chamber of the valve housing 26 consists in that a change of the ratio of the surfaces 42 and 46 is made possible which does not make necessary a change of the size of the reaction pressure surface 42, whereby the dimensioning of this reaction pressure surface of the valve adjusting member may be selected to meet other requirements. For the reaction pressure surface 42 acted upon by a reaction pressure proportional to the working pressure in the working pressure chamber 22 must be, for example, in a predetermined relation to the working pressure surface of the working piston 11 acted upon by the working pressure of the same working pressure chamber 22 in order to obtain a configuration or curve of the manual force within the proportionality range which is symmetrical for the left and right hand deflection or turning of the steering wheel. This will become clear from the following description of the operation of the control valve 25 according to the present invention for the left-hand deflection of the steering wheel corresponding to the negative directional sense of the directional arrow $M_S$ at the coupling pin 5 in FIG. 2. With a left-hand turning or deflection, both an axial force directed away from the coupling pin 5 as also a circumferential force directed in the negative directional sense of $M_S$ become effective at the steering nut 8. The circumferential force seeks to displace the control bar 28 and therewith the valve adjusting member 27 in the direction opposite the steering shaft 15. The base-load spring 40 again opposes this movement so that a curve 67 symmetrical to the curve section 41 results for the mechanical range of the manual force, in which the piston force of the working piston 11 is equal to the axial force at the steering nut 8, which results from the steering worm moment $M_S$. If the circumferential force at the steering nut 8 has overcome the prestress force of the base-load spring 40 during an increasing left-hand deflection or turning, the respective pressure medium connections between the valve connections 30 and 34 and between the valve connections 24 and 32 are throttled by the control edges 37 and 39, respectively, whereas in contrast thereto the pressure medium connections between the valve connections 30 and 31 and between the valve connections 24 and 34 are further opened up by the control edges 36 and 38, respectively, so that a higher pressure will establish itself in the working pressure chamber 21 than in the working pressure chamber 22. In order to let a manual force component become noticeable at the steering wheel also during a left-hand deflection which is proportional to the working pressure of the working pressure chamber 21, the end face 68 of the valve adjusting member 27 opposite the reaction pressure surface 42 cooperates as reaction pressure surface with a reaction relief pressure surface 69 of the piston section 57 which is directed opposite thereto, within a common reaction pressure chamber 70 of the valve housing 26, which is connected with the working pressure chamber 21 by way of a housing channel 71. In order that the curve section 72 (in FIG. 3) characterizing the progress of the reaction pressure force of the reaction pressure surface 68 is disposed symmetrical to the corresponding curve section 45 of the right-hand deflection, the ratio of the reaction pressure surface 42 cooperating with the working pressure chamber 22 to the reaction pressure surface 68 cooperating with the working pressure chamber 21 must be equal to the ratio of the working pressure surface of the working piston 11 acted upon by the pressure of the working pressure chamber 22 to the working pressure surface of the working piston 11 acted upon by the pressure of the working pressure chamber 21. This surface ratio is equal to 1 in the servo-steering mechanism of FIGS. 1 and 2, i.e., the reaction pressure surface 68 is equal to the reaction pressure surface 42. The advantage of the present invention which has already been indicated hereinabove now resides in being able to maintain the dependency of a reaction pressure surface on the corresponding working pressure surface, which is required for symmetry reasons, also when a ratio of the reaction pressure surface to the reaction relief pressure surface is desired which is different from the ratio of the working pressure surfaces of the working piston.

The end of the proportionality range 72 is again determined by the ratio of the prestress force of the reaction spring member 55 to the reaction relief pressure surface 69. As long as the reaction pressure in the common reaction pressure chamber 70 is smaller than this ratio, the piston section 57 is supported rigidly at the valve housings 26. If, however, the reaction pressure in the reaction pressure chamber 70 is larger than the aforementioned ratio, then the piston section 57 together with the abutment ring disk 64 move in the direction opposite to the steering shaft 15, whereby the cross pin 62 comes into abutment at the wall of the bore 61 and as a result thereof, the piston section 57 is coupled with a valve adjusting member 27, whence the reaction pressure force of the reaction pressure surface 68 acting on the valve adjusting member 27 is reduced by the difference of the reaction relief pressure force of the reaction relief pressure surface 69 and the spring force of the reaction spring member 55 and the range of the manual force limitation illustrated by the curve section 73 results. Since the reaction relief pressure surface 69 is also located in a chamber of the valve housing 26—also the cylinder sleeve 58 is again to be considered as a rigid part of this housing—the same advantages are valid for the arrangement of the piston section 57 and for the influencing of the ratio of the reaction pressure surface 68 to the reaction relief pressure surface 69, which were explained in conjunction with the reaction relief pressure surface 46. In order that the curve section 73 of the manual force limitation for the left-hand deflection is again disposed symmetrically to the curve section 49 of the manual force limitation for the right-hand deflection, the ratio of the reaction relief pressure surface 46 cooperating with the working pressure chamber 22 to the reaction relief pressure surface 69 cooperating with the working pressure chamber 21 is equal to the ratio of the working pressure surface of the working piston 11 acted upon by the pressure of the working pressure chamber 22 to the working pressure surface of the working piston 11 acted upon by the pressure of the working pressure chamber 21. It follows therefrom that the ratio of the reaction pressure surface 68 to the reaction relief pressure surface 69 is equal to 1 in the control valve 25 and only the spring force of the reaction spring member 55 is noticeable as manual force within the area of the curve section 73, if one again neglects the effect of the base-load spring 40.

Figure 1:
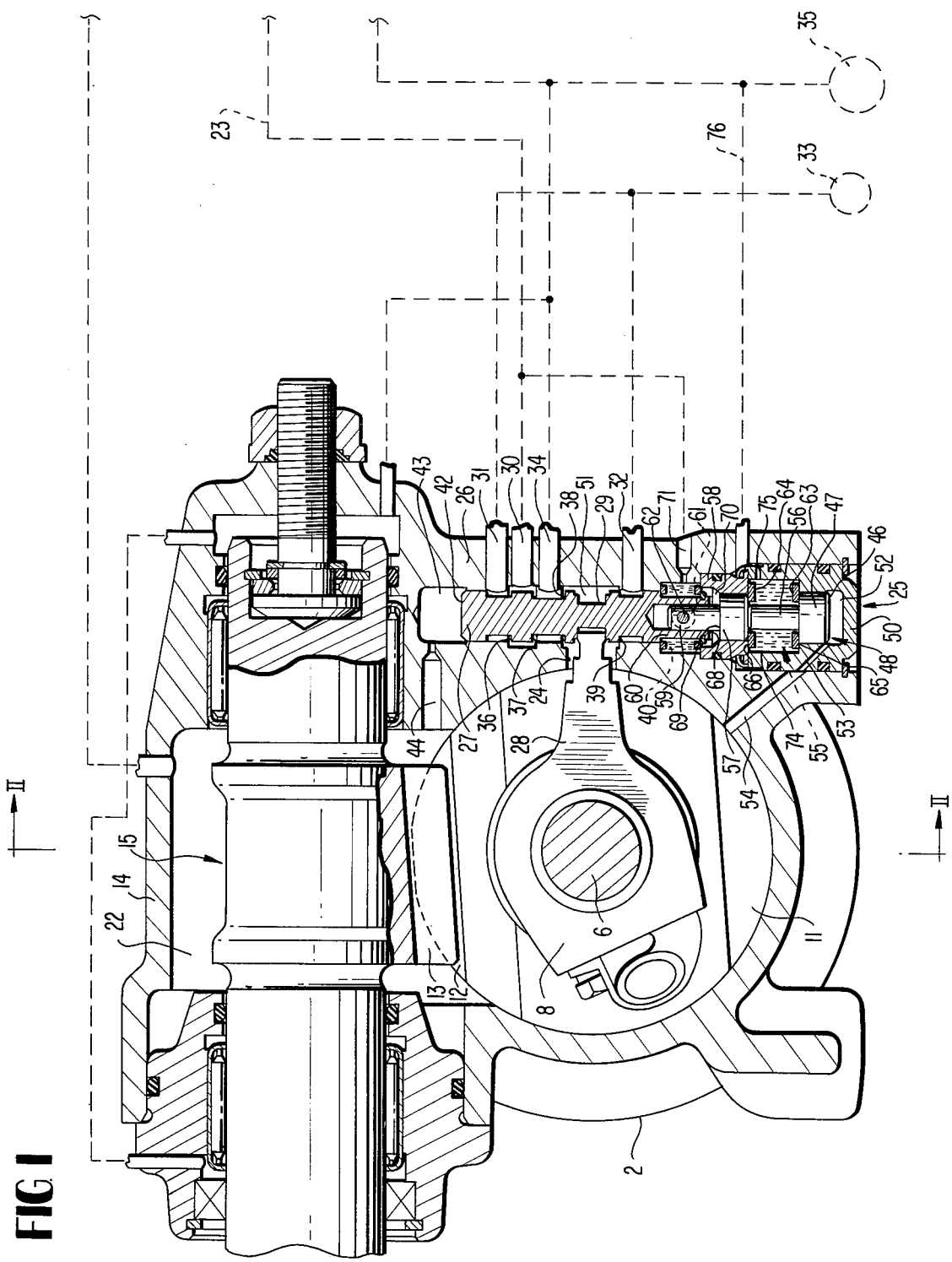
FIG. 1 is a cross-sectional view through a servo-steering system with a first embodiment of a control valve according to the present invention having a four-edge control, taken along line I—I of FIG. 2 and shown at least approximately in its actual dimensions.

In relation to the structural embodiment of the control valve 25 of FIG. 1, it should also be pointed out for the sake of completeness that the annular space 74 between the two piston sections 47 and 57 for the accommodation of the reaction spring member 55 is pressure-relieved by way of a bore 75 of the cylinder sleeve 50 which is in communication with a housing channel 76 connected with the return line 35.

Finally, a still further considerable advantage of the control valve according to the present invention can be seen from FIG. 1. Owing to the arrangement of at least one of the two reaction relief pressure surfaces—in the embodiment of FIG. 1 at least of the surface 46—in a reaction pressure chamber of the valve housing 26, it is possible to mutually support rigidly with respect to one another the two reaction relief pressure surfaces 46 and 69 (the two piston sections 47 and 57 could be, as such, rigidly connected with each other or could be made in one piece). In this manner a double-acting reaction piston 48 indicating the amount and directional sense of the piston pressure force acting on the steering shaft 15, is created which is independent of the construction and control principle of the valve adjusting member 27 and therefore can also be used, for example, for a control valve with a two-edge control as will be described more fully hereinafter by reference to FIGS. 8 to 20.

Figure 5:
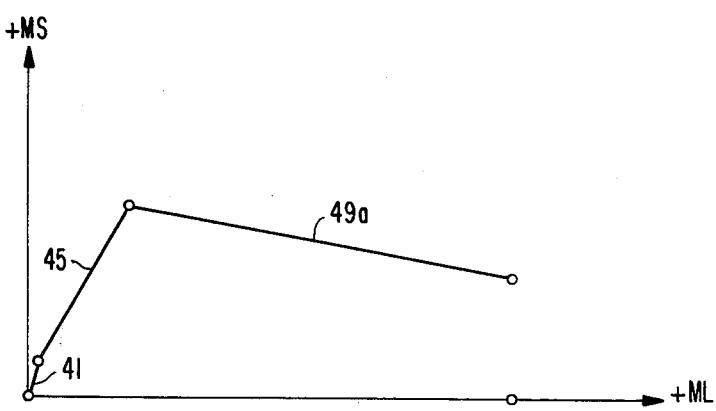
FIG. 5 is a diagram illustrating the curve of the steering moment $M_S$ at the steering worm as a function of the steering shaft moment $M_L$ in the second embodiment of the control valve according to the present invention as illustrated in FIG. 4.
Figure 4:
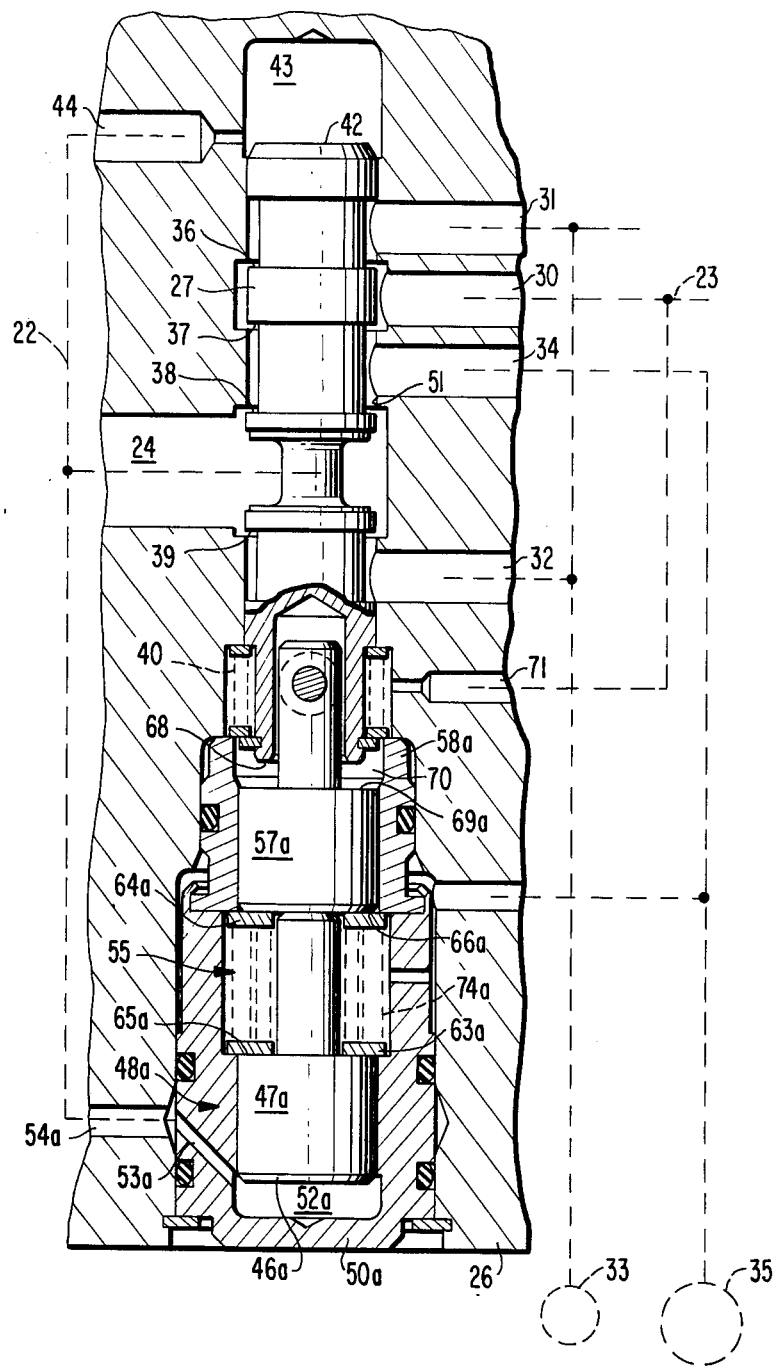
FIG. 4 is a partial cross sectional view, corresponding to FIG. 1, but on an enlarged scale, through a second embodiment of a control valve according to the present invention with a four-edge control.

The second embodiment of the control valve according to the present invention, illustrated in FIG. 4, differs from the control valve of FIG. 1 only in that with the control valve according to FIG. 4 the ratio of the reaction pressure surface to the reaction relief pressure surface is larger than 1. As to the rest, both embodiments are identical, whence the description belonging to FIGS. 1 to 3 and the corresponding reference numerals are also applicable in principle to the embodiment of FIGS. 4 and 5, and only those parts and curves differing in FIGS. 4 and 5 are designated by the additional suffix *a* added to the corresponding reference numeral as used in FIGS. 1 to 3.

In the second embodiment according to FIG. 4, the valve adjusting member 27 is again provided with two oppositely directed reaction pressure surfaces 42 and 68 of identical size which are disposed in reaction pressure chambers 43 and 70 of the valve housing 26. The reaction pressure chamber 43 is in communication with the working pressure chamber 22 indicated in dash lines corresponding to the servo-steering mechanism of FIGS. 1 and 2 whereas the reaction pressure chamber 70 is connected with the other working pressure chamber 21 (not illustrated) by way of the housing channel 71. The valve housing 26 is provided with valve connections 24 and 30 to 32 and 34 and the valve adjusting member 27 is provided with the corresponding control edges 36 to 39 whereby the valve connection 24 is operatively connected with the working pressure chamber 22, the valve connection 30 with the working pressure chamber 21, the valve connection 34 with the return line 35 and the valve connections 31 and 32 with the pressure line 33. The valve adjusting member 27 is retained in the illustrated neutral position by the base-load spring 40 whereby this spring 40 as a result of its prestress force enforces initially a purely mechanical range 41 of the progress or curve of the manual force during the right-hand deflection of the steering wheel. If the prestress force of the base-load spring 40 is overcome, the reaction pressure force of the reaction pressure surface 42 supplies a progress or curve of the manual force corresponding to the curve section 45 which is proportional to the working pressure in the working pressure chamber 22, for such length of time until the reaction pressure in the reaction pressure chamber 52*a*, which is in communication with the working pressure chamber 22 by way of the bore 53*a* of the cylinder sleeve 50*a* and by way of the housing channel 54*a*, is larger than the ratio of the prestress force of the reaction spring member 55 to the reaction relief pressure surface 46a. If the reaction pressure is larger than this ratio, then the piston section 47a effects with its enlarged reaction relief pressure surface 46a a dropping off progress of the adjoining curve section 49a within the area of the manual force limitation because the reaction pressure surface 42 is smaller than the reaction relief pressure surface 46a.

Since also in the embodiment of FIG. 4 both the ratio of the reaction relief pressure surface 46a of the working pressure chamber 22 to the reaction relief pressure surface 69a of the working pressure chamber 21 as also the ratio of the reaction pressure surface 42 of the working pressure chamber 22 to the reaction pressure surface 68 of the working pressure chamber 21 is designed to be equal to the ratio of the two working pressure surfaces of the working piston 11 acted upon by the pressure of the respective working pressure chamber 22 and 21, a progress or curve of the manual force results for the left-hand deflection of the steering wheel which is symmetrical to the curve 41 – 45 – 49a of the right-hand deflection. As can be seen from FIG. 4, for purposes of changing the curve 49 of the manual force limitation in FIG. 3 into the curve 49a of FIG. 5, only two other cylinder sleeves 50a and 58a with enlarged cylinder bores as well as two different piston sections 47a and 57a with reaction relief pressure surfaces 46a and 69a larger in diameter are required.

The third embodiment in FIG. 6 of the control valve according to the present invention differs from the first embodiment in FIGS. 1 and 2 by the absence of a double-acting reaction piston as well as by a different ratio of the reaction pressure surface to the reaction relief pressure surface. The two embodiments, however, are identical in relation to the four-edge control principle so that the corresponding description and the reference numerals in FIGS. 1 to 3 are also valid for FIGS. 6 and 7 and only the differing parts and curves in FIGS. 6 and 7 carry as suffix the additional reference character b added to the corresponding reference numeral of FIGS. 1 to 3. The two control edges 36 and 37 of the valve-adjusting member 27b control the respective pressure medium connection of the valve connection 30 of the valve housing 26b, which is connected with the working pressure chamber 21 by way of the housing channel indicated at 23, with the valve connection 31 connected with the pressure line 33 and with the valve connection 34 connected with the return line 35 whereas the control edges 38 and 39 of the valve-adjusting member 27b are interconnected in an analogous manner in the two pressure medium connections of the valve connection 24 which is connected with the other working pressure chamber 22, with the valve connection 34 and with a further valve connection 32 connected with the pressure line 33. At its end faces the valve-adjusting member 27b is provided with one rigid fixed coupling pin 59b and 77b each, which engage with radial play into a corresponding central bore 78b and 79b of two pot-shaped reaction pistons 47b and 57b. Each coupling pin 59b and 77b is connected for limited movement with its reaction piston 57b and 47b in the manner described by reference to FIGS. 1 and 2 by means of its cross pin 62b and 80b and radial apertures 61b and 81b of the corresponding reaction piston, which in its turn is supported with respect to the valve housing 26b by way of a reaction spring member 82b and 83b subjected to a prestress force.

The mutually adjacent end faces of the valve-adjusting member and of the reaction pistons operate as reaction pressure surface 42b and 68b and as reaction relief pressure surface 46b and 69b, respectively, and are acted upon by the reaction pressure of a common reaction pressure chamber 43b and 70b of the valve housing 26b, respectively. The reaction pressure chamber 43b is in communication by way of the central bore 78b and the apertures 81b with an annular groove 84b provided at the circumference of the reaction piston 47b which, in its turn, is exposed or subjected by way of a housing channel 44b to a pressure proportional to the working pressure in the working pressure chamber 22. A pot-shaped cylinder sleeve 50b serves as housing abutment for the base-load spring 40 holding the valve-adjusting member 27b in the illustrated neutral position, which is fixedly inserted into the enlarged end section of the housing bore 51b for the valve-adjusting member 27b and which accommodates the reaction piston 57b as well as the reaction spring member 83b which supports this piston 57b against an abutment 85b of the cylinder sleeve 50b. At its end facing the reaction pressure chamber 70b the cylinder sleeve 50b is provided at the circumference with an annular groove 86b, which is connected, on the one hand, by way of a housing channel 71b with the working pressure chamber 21 (FIG. 2) and, on the other, by way of radial grooves 87b provided on the end face of the cylinder sleeve 50b facing the reaction pressure chamber 70b, with the last-mentioned reaction pressure chamber 70b. Each reaction spring member 82b and 83b includes two concentric coil springs whose one spring ends abut at an annular abutment surface 88b on the associated reaction piston 47b and 57b and whose other spring ends abut at a ring-shaped spring plate 89b. Each of the reaction spring members 82b and 83b is traversed with radial play by a fixed clamping pin 90b of the associated reaction piston 47b and 57b, whereby the prestress force is absorbed by a spring ring 91b inserted into an annular groove of the respective clamping pin 90b, at which is supported the spring plate 89b. The spring plate 89b of the reaction spring member 82b abuts at a direct abutment 92b of the valve housing 26b, and the valve housing chamber 93b which receives this reaction spring member is pressure-relieved by a housing channel 94b connected with the return line 35. The chamber 74b of the cylinder sleeve 50b which accommodates the reaction spring member 83b is in communication by way of a radial bore 75b with a pressure-relieved housing channel 76b which is connected with the return line 35.

With a right-hand deflection of the steering wheel, at first a pure mechanical range of the manual force progress or curve is forcibly brought about in the already described manner by the base-load spring 40 until after overcoming the prestress force of this spring, the reaction pressure surface 42b provides the curve 45 of the manual force which is proportional to the working pressure of the working pressure chamber 22. If the reaction pressure in the reaction pressure chamber 43b is larger than the ratio of the prestress force of the reaction spring member 82b to the reaction relief pressure surface 46b, then the wall of the aperture 81b abuts at the cross pin 80b so that the reaction piston 47 is rigidly connected with the valve-adjusting member 27b. Since the ratio of the reaction pressure surface 42b to the reaction relief pressure surface 46b is designed to be larger than 1, a rising curve 49b of the manual force results within the range of the manual force limitation.

In the embodiment of FIG. 6, the interchangeability of the reaction pistons and cylinder sleeves for purposes of changing the ratio of the reaction pressure surface to the reaction relief pressure surface is illustrated in the drawing only for the reaction piston 57b operable during the left-hand deflection of the steering wheel. Of course, this interchangeability by means of a cylinder sleeve is also realizable for the other reaction piston 47b. Furthermore, it is feasible within the scope of the present invention to so construct the coupling of the reaction piston to the valve-adjusting member in the manner illustrated in FIG. 1 so that the same adjusting member can be used for the three embodiments in FIGS. 1 to 6 of the control valve according to the present invention.

At first the construction and operation of the servo-steering mechanism constructed according to the principle of the two-edge control will be described hereinafter by reference to FIGS. 8 to 12.

A steering spindle member 103 (FIG. 9) is rotatably and axially non-displaceably supported in a housing end cover 101 of a steering gear housing 102 constructed as pressure-medium working-cylinder by means of a bearing arrangement generally designated by reference numeral 104. At its end outside of the housing, the steering spindle member 103 is provided with a coupling pin 105, by way of which it can be connected with the steering wheel (not shown). At its end on the inside of the housing, the steering spindle member 103 includes a steering worm 106 non-rotatable with respect thereto, which is spirally movably connected with a steering nut 108 by means of a ball circulation generally designated by reference numeral 107. The steering nut 108 is rotatably but axially non-displaceably supported by means of two bearing arrangements generally designated by reference numeral 109 and 110 in a differential working piston generally designated by reference numeral 111 which is displaceably guided in a steering gear housing 102. The differential working piston 111 is provided at its circumference with a toothed rack profile 112 into which engages a toothed segment 113 of a steering shaft 115 rotatably supported in a housing bulge 114 of the steering gear housing 102; the steering shaft 115 is adapted to be operatively connected in a conventional manner with the steered vehicle wheels (not shown).

The differential working piston 111 which is essentially ringshaped in cross section, is offset or stepped into a wide piston section 196 and into a narrow piston section 197 (FIG. 9) for purposes of forming two differently large working pressure surfaces 100 and 195. Whereas the wide piston section 196 slides directly in the cylinder bore 117 of the steering gear housing 102 and is sealed off with respect to the latter by an annular seal 116, the narrow piston section 197 slides in an intermediate ring 198 which is axially immovably held in the cylinder bore 117 and is sealed off with respect to the latter as also with respect to the narrow piston section 197 by one annular seal 199 each. At its inner circumference the differential working piston 111 is sealed off by an annular seal 118 with respect to a sealing sleeve 119 which is held at the housing end cover 101 and is sealed off with respect to the latter, and whose concentric bore 120 serves for the passage of the steering spindle part 103 into the interior space of the steering gear housing 102. The cylinder bore 117 is subdivided by the seals 116 and 118 of the differential working piston 111 as well as by the seals 199 of the intermediate ring 198 into a wide working pressure chamber 121 and into a narrow working pressure chamber 122. The working pressure chamber 121 is connected by way of a housing channel 123 with a control valve generally designated by reference numeral 125 (FIG. 8) whose valve housing 126 is in one piece with the steering housing 102. A conventional safety valve 125c, not illustrated in detail, is interconnected between the housing channel 123 and the associated valve connection or port 130 of the control valve 125, whereby valve housing 126c of the safety valve 125c is constructed in one piece with the valve housing 126 of the control valve 125. The narrow working pressure chamber 122 is in communication by way of a housing channel 124c with a reservoir or storage pressure line 133, whereby the safety valve 125c is again disposed or interconnected between the working pressure chamber 122 and the storage pressure line 133. The control valve 125 is provided with two further valve connections or ports 131 and 134 adjacent the valve connection or port 130 of the wide working pressure chamber 121, of which the connection 131 is operatively connected with the storage pressure line 133 and the connection 134 is operatively connected with an essentially pressure-relieved return line 135. The return line 135 is in communication by way of a housing channel 135c with the interior space 122c of the steering gear housing 102. In the illustrated neutral position of the valve-adjusting member 127 constructed as control slide member, the valve connection 130 of the wide working pressure chamber 121 is closed off by one control edge 136 and 137 each of the valve-adjusting member 127 with respect to its adjacent valve connections 131 and 134. The actuation of the valve-adjusting member 127 takes place by a rigid control bar 128 of the steering nut 108 in the manner described by reference to the servo-mechanism illustrated in FIGS. 1 and 2. The control bar 128 extends with play through a through-aperture 124 of the steering gear housing 102, which connects the interior space 122c of the latter with the housing bore 151 of the control valve 125 for the valve-adjusting member 127. The end of the control bar 128 which projects into the housing bore 151, engages form-lockingly but jointedly or pivotally into a circumferential groove 129 of the valve-adjusting member 127.

The interior pressure of the narrow working pressure chamber 122 is equal to the storage pressure of the storage pressure line 133 and is therefore essentially constant. The interior pressure of the wide working pressure chamber 121 is adjusted by the two control edges 136 and 137 and is therefore designated hereinafter always by the term "control pressure". In order to equalize the piston pressure forces of the two working pressure surfaces 100 and 195 in the illustrated center stroke position of the working piston 111 for straight drive, the control pressure $p_{St}$ for the center position is equal to $p_{St(O)} = (1/i) \cdot p_{Sp}$, whereby O is the index for the center position of the working piston 111 and for the neutral position of the valve-adjusting member 127 and $i$ the ratio of the working pressure surface 100 acted upon by the control pressure $p_{St}$ to the working pressure surface 195 acted upon by the storage pressure $p_{Sp}$.

The valve-adjusting member 127 is provided with a reaction pressure chamber 143, into which is displaceably inserted a reaction piston 143c rigidly supported directly at the valve housing 126. The reaction pressure surface 142 of the valve-adjusting member 127 which cooperates with this reaction piston 143c and which is acted upon by the reaction pressure of the reaction pressure chamber 143 is equal in cross section to the cross section of the reaction piston 143c. The reaction piston 143c serves exclusively the purpose to render the effective cross section of the reaction pressure surface 142 smaller than the cross section of the housing bore 151. This cross-sectional reduction, however, could also be achieved in that a rigid end pin of the valve-adjusting member 127 which tapers or is reduced in cross section with respect to the housing bore 151 is inserted into an end section of the housing bore 151 corresponding in diameter and operating as reaction pressure chamber, whereby the end face of the end pin then forms the reaction pressure surface of the valve-adjusting member. The reaction pressure chamber 143 is continuously in communication by way of a radial bore 144c of the valve-adjusting member 127 with the valve connection 131 of the storage pressure line 133 so that the reaction pressure of this reaction pressure chamber 143 is equal to the storage pressure $p_{Sp}$ of the narrow working pressure chamber 122. The end face of the valve-adjusting member 127 adjacent the reaction piston 143c as well as this reaction piston itself are arranged in a housing chamber 151c of the valve housing 126, which is pressure-relieved by way of a housing channel 144 terminating in the interior space 122c. At its end face opposite the reaction piston 143c the valve-adjusting member 127 is provided with a reaction pressure surface 168 oppositely directed to the reaction pressure surface 142; the reaction pressure surface 168 is disposed in a reaction pressure chamber 170 formed by a section of the housing bore 151. The effective cross section of the reaction pressure surface 168 is equal to the cross section of the reaction pressure chamber 170 which is connected by way of a housing channel 171 with the wide working pressure chamber 121. The ratio of the reaction pressure surface 168 to the reaction pressure surface 142 is equal to $i$, i.e., equal to the ratio of the working pressure surface 100 to the working pressure surface 195, so that the reaction pressure forces of the reaction pressure surfaces 142 and 168 are equalized in the neutral position of the valve-adjusting member 127 and the latter is centered by these pressure forces. It is also assured by this mutual matching of the reaction pressure surfaces 142 and 168 of the valve-adjusting member 127 that the curve sections 145 and 172 (FIGS. 11 and 12) of the curve of the respective load-pressure-dependent manual force and of the torque $M_S$ of the steering nut 108 noticeable at the steering wheel proceeds symmetrically to the abscissa axis for the steering shaft moment $M_L$.

Figure 9:
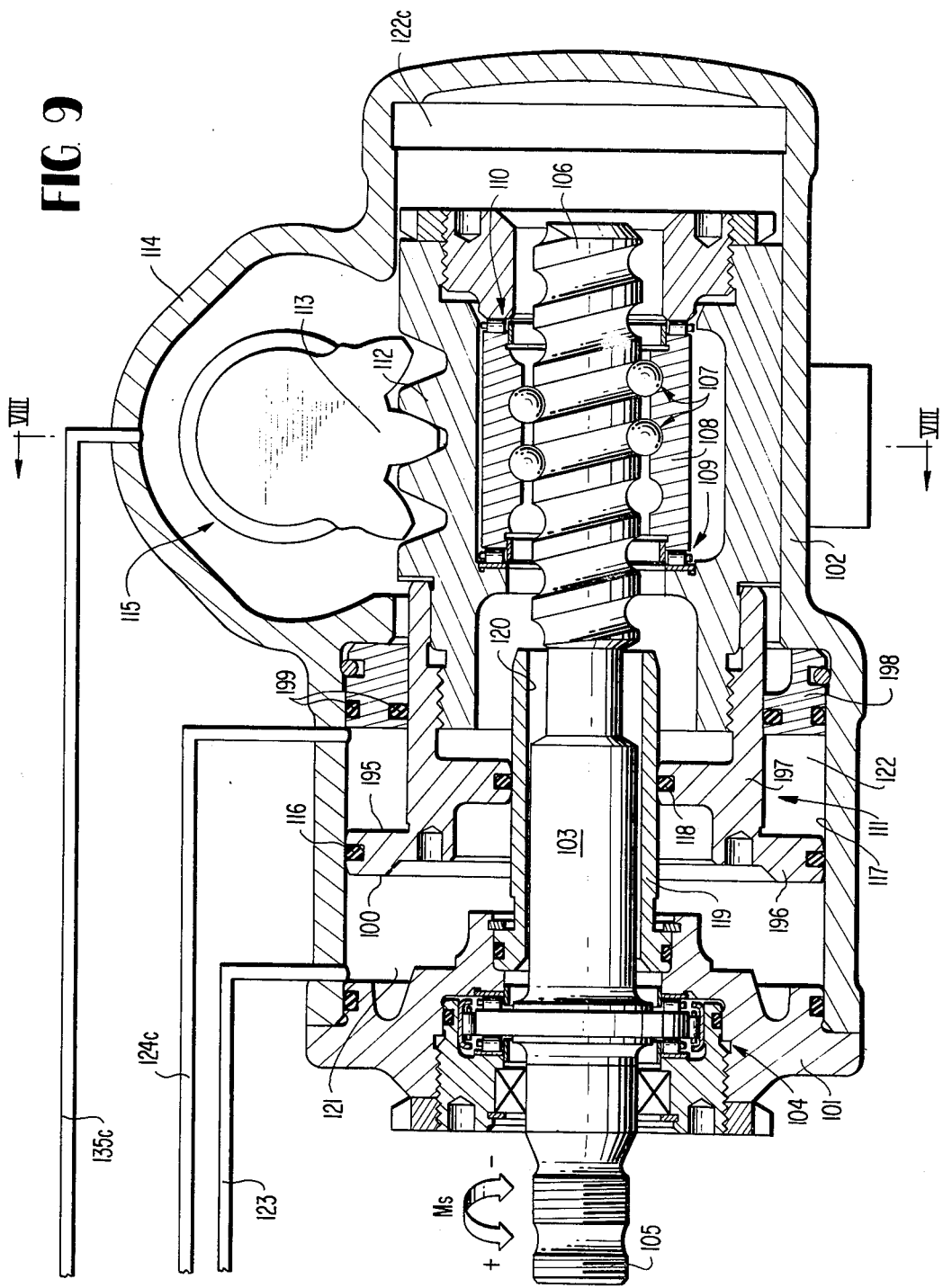
FIG. 9 is an axial cross-sectional view through the servo-steering mechanism of FIG. 8, taken along line IX—IX of FIG. 8 and again illustrating the various parts in at least approximately actual dimensions.

Within the proportionality range 145 of the manual force, the control valve 125 operates as follows during a right-hand deflection:

As a result of the right-hand deflection of the steering wheel corresponding to the positive directional sense of the directional arrow $M_S$ at the coupling pin 105 in FIG. 9, a circumferential force becomes effective at the steering nut 108 which adjusts the valve-adjusting member 127 by way of the control bar 128 in the direction toward the steering shaft 115 so that the control pressure in the wide working pressure chamber 121 is decreased and a piston pressure force becomes effective at the working piston 111 which seeks to rotate the toothed segment 113 in the clockwise direction in relation to FIG. 9. The reaction pressure in the reaction pressure chamber 170 is also decreased corresponding to the pressure decrease in the working pressure chamber 121 so that the pressure force of the reaction pressure surface 168 becomes smaller than the reaction pressure force of the reaction pressure surface 142. The difference of these pressure forces produces at the steering worm 106 a torque which is noticeable at the steering wheel. In a corresponding manner, the valve-adjusting member 127 is then moved away from the steering shaft 115 within the proportionality range 172 in case of a left-hand deflection of the steering wheel and the control pressure in the working pressure chamber 121 and therewith the reaction pressure in the reaction pressure chamber 170 is increased. The differential pressure force which establishes itself at the valve-adjusting member 127 is directed in the direction toward the steering shaft 115 so that a torque becomes noticeable at the steering wheel.

Figure 8:
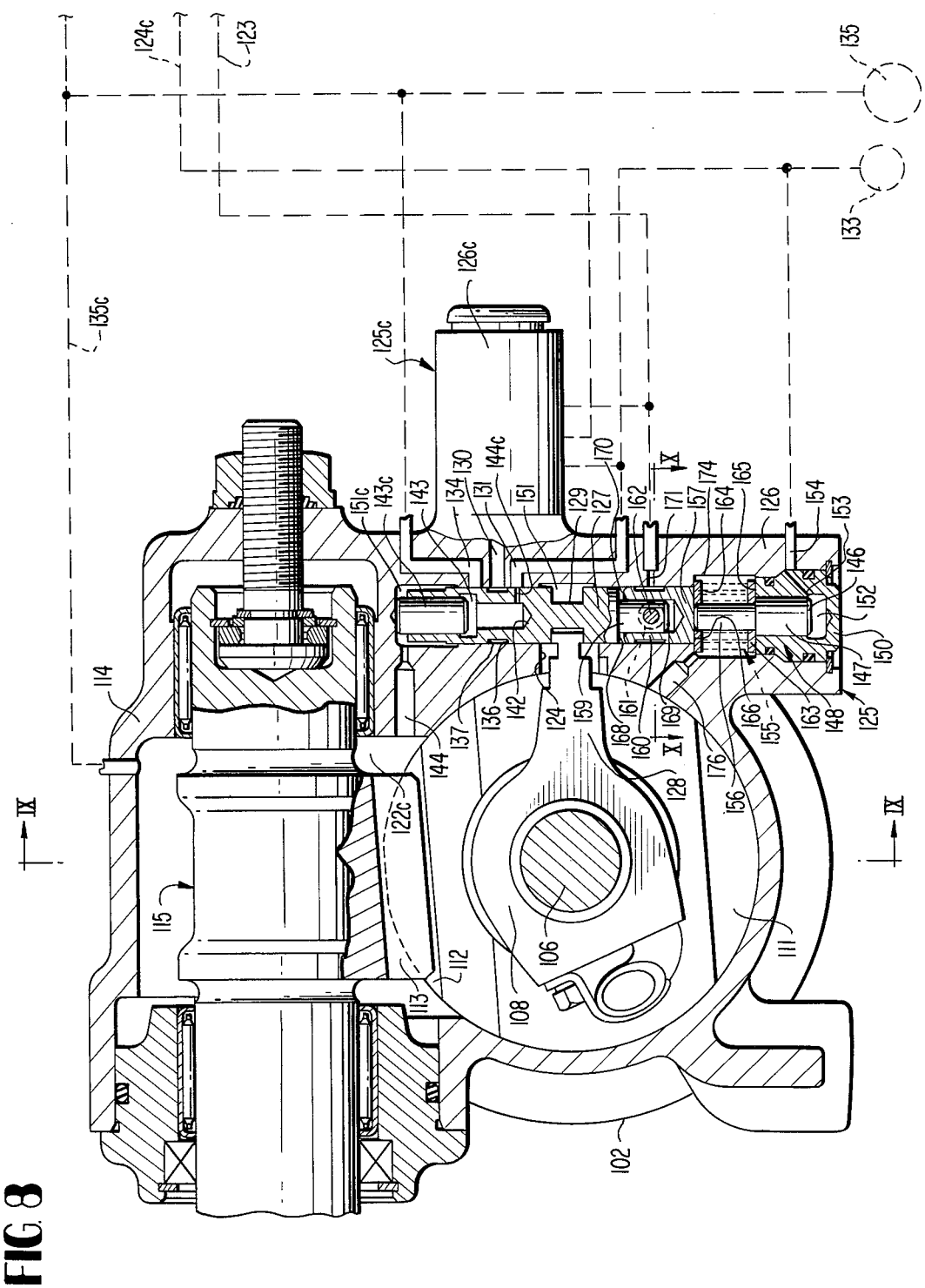
FIG. 8 is a cross-sectional view through a servo-steering mechanism with a differential working piston and with a fourth embodiment of the control valve according to the present invention having a two-edge control, taken along line VIII—VIII of FIG. 9 and showing the parts in at least approximately actual dimensions.

At its end associated with the reaction pressure chamber 170, the valve-adjusting member 127 is operatively connected for limited movement with a double-acting reaction-piston generally designated by reference numeral 148 and arranged coaxially with respect thereto. For this purpose, the valve-adjusting member 127 includes a coupling pin 159 which is provided at its end with a cross pin 162 fixed with respect thereto and which projects with radial play into the central bore of a fixed coupling sleeve 160 of a piston section 157 of the double-acting reaction-piston 148. The ends of the cross pin 162 projecting radially from the coupling pin 159 engage each with play into a corresponding radial bore 161 (FIGS. 8 and 10) of the coupling sleeve 160. The bores 161 connect the reaction pressure chamber 170 with a circumferential groove 160c (FIG. 10) of the coupling sleeve 160 which is constantly connected with the housing channel 171 (FIG. 8). The end face of the piston section 157 facing the valve-adjusting member 127 forms a reaction relief pressure surface 169 acted upon by the reaction pressure of the reaction pressure chamber 170, which in its effective cross section is equal to the reaction pressure surface 168.

On its end face opposite the valve-adjusting member 127, the piston section 157 abuts simultaneously at a ring-shaped abutment disk 164 of a ring-shaped reaction spring member 155 which is under a prestress force as also at a spacer pin 156 of a second piston section 147 of the reaction piston 148, which extends through the reaction spring member 155. The piston section 147 is displaceably guided in the cylinder bore of a pot-shaped cylinder sleeve 150 which, in its turn, is immovably retained in the enlarged inlet section of the housing bore 151. The end face of the piston section 147 opposite the spacer pin 156 forms a reaction relief pressure surface 146 acted upon by the pressure in the closed end section of the cylinder bore of the cylinder sleeve 150 which acts as reaction pressure chamber 152, and is so matched in its effective cross section to the other reaction relief pressure surface 169 that the ratio of the reaction relief pressure surface 169 to the reaction relief pressure surface 146 is equal to $i$, i.e., equal to the ratio of the working pressure surface 100 to the working pressure 195. The reaction pressure chamber 152 is in communication by way of a radial bore 153 of the cylinder sleeve 150 and by way of a housing channel 154 with the storage pressure line 133 and therewith also with the narrow working pressure chamber 122.

The reaction spring member 155 consists of two concentric coil springs which are clamped between the annular-shaped abutment disk 164 and a further annular-shaped abutment disk 163. The piston section 147 abuts simultaneously at the ring-shaped abutment disk 163 and at the other piston section 157. The prestress force of the reaction spring member 155 is absorbed by the abutment edges 165 and 166 which are fixed at the housing and cooperate respectively with one of the ring-shaped abutment disks 163 and 164. The housing chamber 174 receiving the reaction spring member 155 is pressure-relieved by way of a housing channel 176 terminating in the interior space 122c.

As long as the prestress force of the reaction spring member 155 is larger than the difference of the pressure forces of the reaction relief pressure surfaces 146 and 169, both piston sections 147 and 157 are rigidly supported with respect to the valve housing 126 so that only the reaction pressure force of the reaction pressure surfaces 142 and 168 acts on the valve-adjusting member 127 during the right-hand and left-hand deflection of the steering wheel as indicated by the curve sections 145 and 172.

During the right-hand deflection of the steering wheel, the reaction relief pressure force of the piston section 147 is larger than the oppositely directed pressure force of the piston section 157 by reason of the reduction of the control pressure in the wide working pressure chamber 121 and therewith of the reaction pressure in the reaction pressure chamber 170. If the difference of these two pressure forces exceeds the prestress force of the reaction spring member 155, the piston section 147 displaces the piston section 157 in the direction toward the valve-adjusting member 127 under compression of the reaction spring member 155 so that the wall of the bore 161 abuts at the cross pin 162 and the explained pressure force difference acts on the valve-adjusting member 127 as reaction relief. Furthermore, the difference of the pressure forces of the reaction pressure surfaces 142 and 168 acts on the valve-adjusting member 127 as reaction.

During the left-hand deflection of the steering wheel, the directional sense of the respective pressure force difference reverses at the double-acting reaction piston 148 and at the valve-adjusting member 127 so that within the range of the manual force limitation, in which the reaction spring member 155 is compressed, the piston section 157 exerts on the valve-adjusting member 127 a tensional force directed away from the valve-adjusting member 127.

Figure 10:
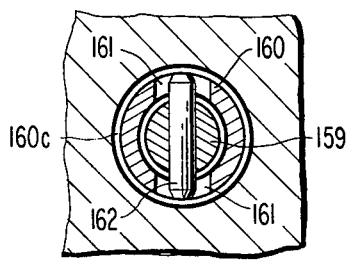
FIG. 10 is a cross-sectional view through the control valve taken along line X—X in FIG. 8 and illustrating the same in at least approximately actual dimensions.
Figure 11:
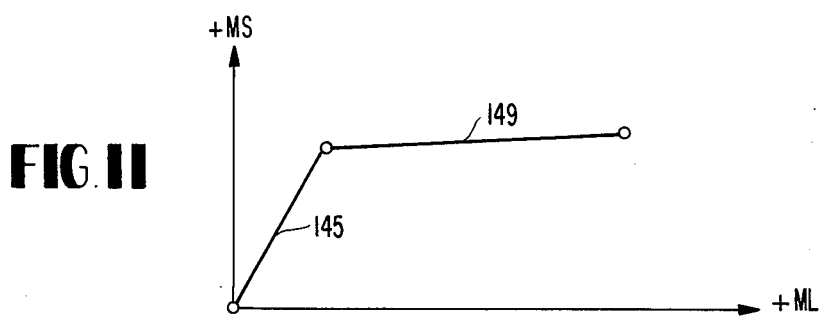
FIG. 11 is a diagram illustrating the curve of the steering moment $M_S$ at the steering worm as a function of the steering shaft moment $M_L$ for the right-hand deflection of the steering wheel in the fourth embodiment of the control valve according to the present invention as illustrated in FIGS. 8, 9 and 10.
Figure 12:
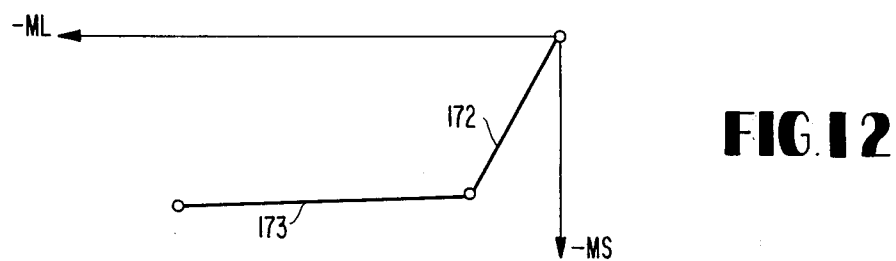
FIG. 12 is a diagram illustrating the curve of the steering moment $M_S$ at the steering worm, corresponding to FIG. 11, however, for the left-hand deflection of the steering wheel in a servo-steering mechanism as illustrated in FIGS. 8 through 10.

Since for the right-hand and for the left-hand deflection, the respective ratio of the reaction pressure surface 142 and 168 to the associated reaction relief pressure surface 146 and 169, respectively, is equal to one in the fourth embodiment of the control valve according to FIGS. 8 to 10, the curve sections 149 and 173 which extend approximately parallel to the abscissa, result for the range of the manual force limitation in FIGS. 11 and 12.

Figure 14:
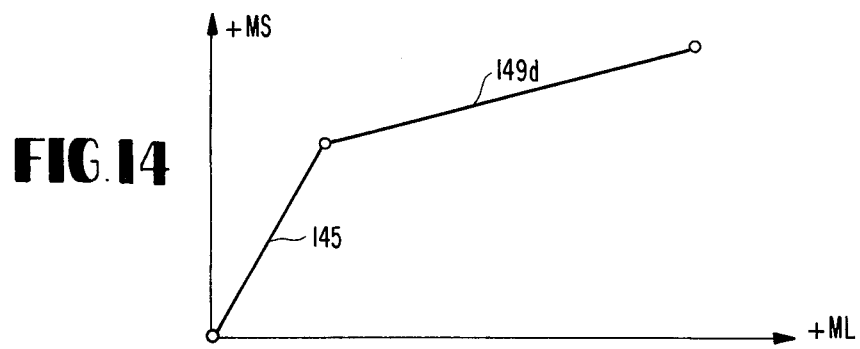
FIG. 14 is a diagram illustrating the curve of the steering moment $M_S$ at the steering worm as a function of the steering shaft moment $M_L$ in the fifth embodiment of the control valve according to the present invention as illustrated in FIG. 13.

The fifth embodiment according to FIGS. 13 and 14 of the control valve according to the present invention differs from the fourth embodiment illustrated in FIGS. 8 to 12 exclusively by the dimensions and the housing support of its double-acting reaction piston. Consequently, the corresponding parts of FIGS. 13 and 14 carry the same reference numerals as those in FIGS. 8 to 12, whereas only the differing parts of FIGS. 13 and 14 are designated by the reference character $d$ added as suffix to the corresponding reference numerals of FIGS. 8 to 12.

The valve housing 126d of the control valve 125d is provided with three valve connections 130, 131 and 134 for the housing channel 123 leading to the wide working pressure chamber 121 (FIG. 9), for the storage pressure line 133 as well as for the return line 135, which are valved or controlled by means of the two control edges 136 and 137 of the valve-adjusting member 127. The ratio of the reaction pressure surfaces 142 and 168 of the valve-adjusting member 127 is equal to $i$, whereby the reaction pressure surface 142 is located in a reaction pressure chamber 143 of the valve-adjusting member 127, into which is displaceably inserted a reaction piston 143c directly supported at the valve housing 126d in order to be able to keep the effective cross section of the reaction pressure surface 142 smaller than the effective cross section of the reaction pressure surface 168. The valve-adjusting member 127 is operatively connected for limited movement in the manner described hereinabove by means of coupling pins 159 and the coupling sleeves 160d with the adjacent piston section 157d of a double-acting reaction-piston generally designated by reference numeral 148d. In order to keep the effective cross section of the reaction relief pressure surface 169d of the piston section 157d, which together with the reaction pressure surface 168 is located in a common reaction pressure chamber 170 of the valve housing 126d, smaller than the effective cross section of the reaction pressure surface 168, the piston section 157d is displaceably guided in the cylinder bore of a cylinder sleeve 158 which together with an adjacent coaxial pot-shaped cylinder sleeve 150d is inserted into the enlarged inlet section of the housing bore 151d for the valve-adjusting member 127 and is immovably fixed also with respect to the valve housing 126d. Apart from the differing diameter ratios of its pressure surfaces, the arrangement and construction of the double-acting reaction piston 148d as well as of its cylinder sleeves 150d and 158 correspond to the first embodiment according to FIGS. 1 and 2 of the control valve according to the present invention. Accordingly, the piston section 157d abuts simultaneously at a reaction spring member 155 as well as at a spacer pin 156 of a second piston section 147d guided in the cylinder bore of the cylinder sleeve 150d. The reaction relief pressure surface 146d of the piston section 147d is located in a reaction pressure chamber 152d of the cylinder sleeve 150d, which is connected with the storage pressure line 133 by means of a radial bore 153 and by way of a housing channel 154 communicating with the latter. In contrast thereto, the reaction pressure chamber 170 is in communication with the wide working pressure chamber 121 (FIG. 9) by way of a housing channel 171.

The ratio of the reaction relief pressure surface 169d of the reaction pressure chamber 170 connected with the wide working pressure chamber 121 to the reaction relief pressure surface 146d of the reaction pressure chamber 152d connected by way of the housing channels 154 and 124c with the narrow working pressure chamber 122 (FIG. 9) as well as with the pressure storage line 133, is equal to $i$, i.e., is equal to the ratio of the working pressure surface 100 of the wide working pressure chamber 121 (FIG. 3) to the working pressure surface 195 of the narrow working pressure chamber 122, as is also valid in a corresponding manner for the reaction piston 148 in FIG. 8. Consequently, the difference of the reaction relief pressure forces of the surfaces 169d and 146d which act externally on the valve-adjusting member 127 after overcoming the prestress force of the reaction spring member 155, is always proportional to the difference of the working pressure forces of the surfaces 100 and 195 resulting at the working piston 111 (FIG. 9). Up to the point of overcoming the prestress force of the reaction spring member 155, during the right-hand deflection of the steering wheel the difference of the reaction pressure forces of the surfaces 142 and 168 directed toward the reaction piston 148d provides the proportionality range of the manual force or of the steering worm moment $M_S$ represented by the curve section 145 in FIG. 14.

Since the ratio of reaction pressure surface 142 and 168 to the associated reaction relief pressure surface 146d and 169d is larger than 1 at the reaction piston 148d, there results within the range of the manual force limitation the rising progress of the manual force and of the steering worm moment $M_S$ which is illustrated by the curve section 149d.

Figure 15:
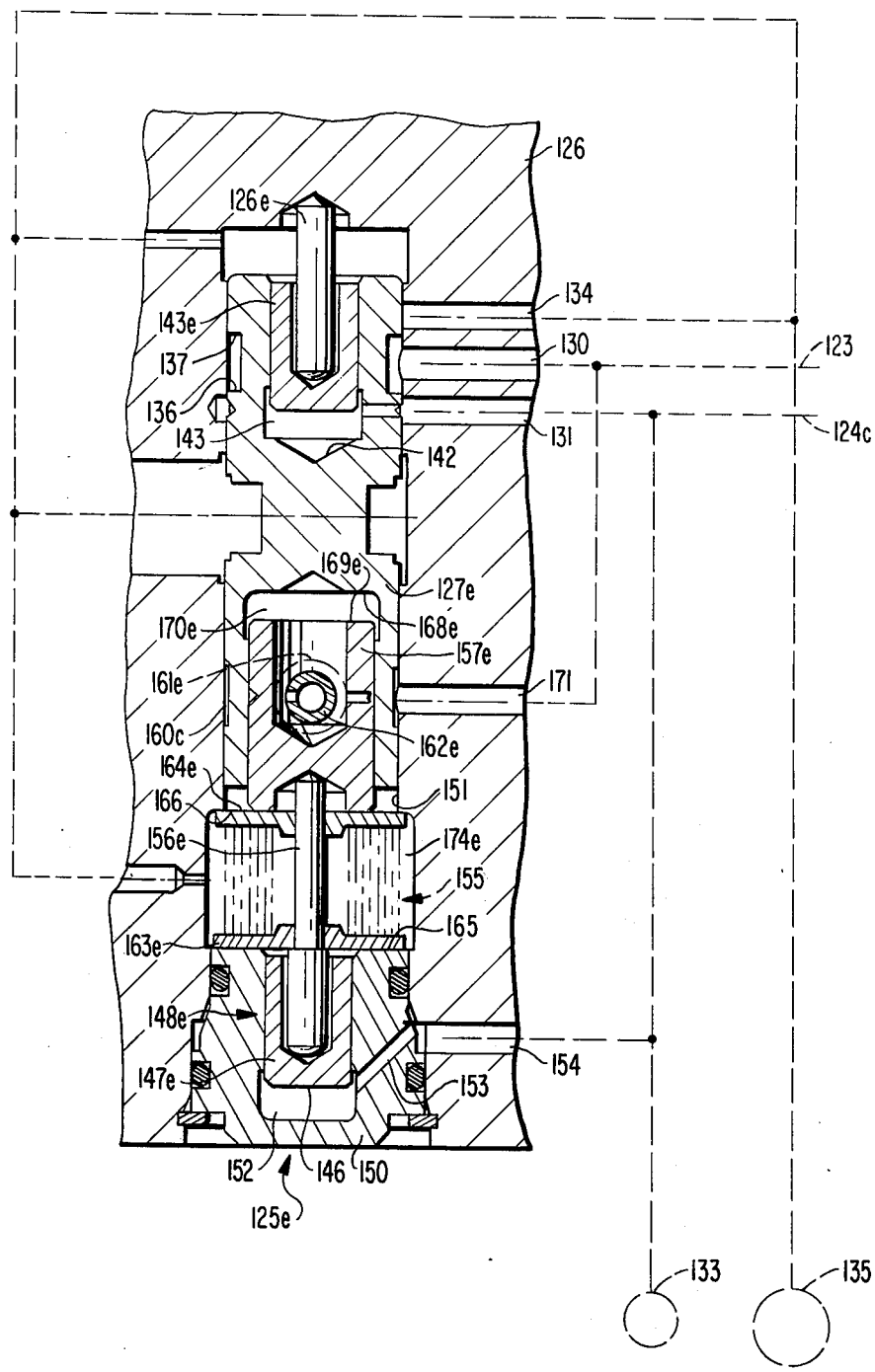
FIG. 15 is a partial cross-sectional view through a sixth embodiment of a control valve according to the present invention with a two-edge control in a partial cross-sectional view through a servo-steering mechanism corresponding to FIG. 8 but on an enlarged scale.

The sixth embodiment of the control valve according to the present invention illustrated in FIG. 15 is intended for a servo-steering mechanism according to FIGS. 8 and 9 with a two-edge control and does not differ functionally from the control valve of FIG. 8 so that the operational illustrations of FIGS. 11 and 12 are valid also for this embodiment. For the description of the sixth embodiment to follow hereinafter, the corresponding reference numerals of FIGS. 8 to 12 are used in principle, and only those parts which differ from FIGS. 8 to 12 carry the additional reference character e as suffix.

The valve housing 126 of the control valve 125e in FIG. 15 includes again three valve connections 130, 131 and 134 for the housing channel 123 leading to the wide working pressure chamber 121 (FIG. 9), for the storage pressure line 133 as well as for the return line 135. The valve connection 131 and the storage pressure line 133 are in communication by way of the housing channel 124c with the narrow working pressure chamber 122 (FIG. 9). The three mentioned valve connections are controlled in the described manner by the two control edges 136 and 137 of the valve-adjustng member 127e guided displaceably in the housing bore 151. The valve-adjusting member 127e is provided with a narrow reaction pressure chamber 143 and with a wide reaction pressure chamber 170e. The effective cross section of the reaction pressure surface 142 of the reaction pressure chamber 143 is determined by a pot-shaped reaction piston 143e displaceably inserted into the latter, which, for purposes of avoiding cross forces between the reaction piston 143e and the valve-adjusting member 127e, is fixedly supported with respect to the valve housing 126 by way of a support bolt 126e provided with ball-shaped ends. The one piston section 157e of the double-acting reaction-piston 148e is displaceably inserted into the wide reaction pressure chamber 170e. The piston section 157e is traversed radially by a clamping sleeve 162e whose two free ends, corresponding to the arrangement of FIG. 10, engage with play into two dimaetrically mutually opposite radial apertures 161e of the valve-adjusting member 127e. The apertures 161e terminate radially inwardly in the central bore of the pot-shaped piston section 157e in open communication with the reaction pressure chamber 170e and radially outwardly thereof in a circumferential groove 160c of the piston section 157e which is connected by way of a housing channel 171 with the wide working pressure chamber 121 (FIG. 9). The piston section 157e determines the larger effective cross section of the reaction pressure surface 168e of the reaction pressure chamber 170e and is simultaneously supported at the reaction spring member 155 as well as by way of a spacer bolt 156e provided with ball-shaped ends at the other pot-shaped piston section 147e. The reaction relief pressure surface 169e of the piston section 157e is necessarily equal in its effective cross section to the reaction pressure surface 168e. The reaction pressure chamber 152 of the reaction relief pressure surface 146 of the piston section 147e is in communication by way of a bore 153 of the cylinder sleeve 150 receiving the piston section 147e and by way of a communicating housing channel 154 with the storage pressure line 133. Both the ratio of the reaction pressure surface 168e to the reaction pressure surface 142 as also the ratio of the reaction relief pressure surface 169e to the reaction relief pressure surface 146 is equal to the ratio $i$ of the working pressure surfaces 100 and 195 so that the control valve 125e has the functional characteristics of FIGS. 11 and 12. This control valve characterizes itself by the fact that neither the reaction piston 143e nor the section 157e exert cross forces on the valve-adjusting member 127e as is also ture in relation to the piston section 147e and the cylinder sleeve 150.

Figure 17:
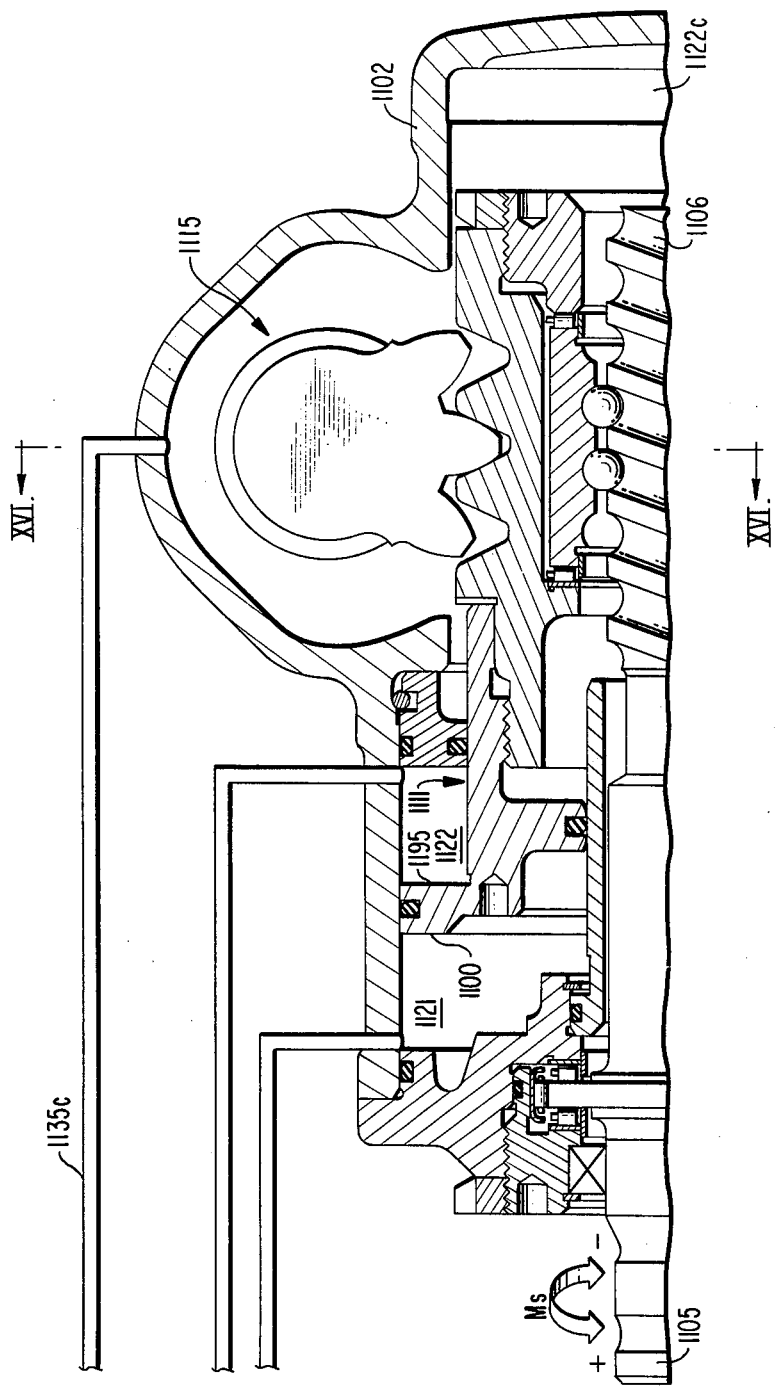
FIG. 17 is a partial axial cross-sectional view of the servo-steering mechanism of FIG. 16, taken along line XVII—XVII of FIG. 16 and illustrating the various parts at least approximately in their actual dimensions.

The servo-steering mechanism according to FIGS. 16 and 18 differs from the servo-steering mechanism of FIGS. 8 to 12 only by the seventh embodiment of the control valve according to the present invention as well as by the opposite pitch of its steering nut. Consequently, the description of the servo-steering mechanism of FIGS. 8 to 10 is valid analogously also for FIGS. 16 and 17 and the following description which refers to FIGS. 16 to 18 utilizes reference numerals of the 1000 series which are increased by 1,000 with respect to the reference numerals used in FIGS. 8 to 12 in connection with mutually corresponding similar parts or operating curves. FIG. 16 thereby shows one-half of a cross-section corresponding to FIG. 8, whereas FIG. 17 shows one-half of an axial cross-section corresponding to FIG. 9 through a servo-steering mechanism with a two-edge control. Since the steering worm 1106 in FIG. 17, in contrast to the steering worm 106 in FIG. 9, has a left-hand pitch and therefore in case of a right-hand deflection of the steering wheel corresponding to the positive directional sense of the directional arrow $M_S$ at the coupling pin 1105—at which the valve-adjusting member 1127 is adjusted in the direction of the steering shaft 1115-the larger piston pressure force has to result at the larger working pressure surface 1100, the position of the two valve connections 1131 and 1134 for the storage pressure line 1133 and for the return line 1135 are interchanged with respect to the valve connection 1130 for the wide working pressure chamber 1121. In this manner in case of a right-hand deflection, the control pressure acting upon the larger working pressure surface 1100 is increased whereas the storage pressure acting upon the smaller working pressure surface 1195 remains constant in the narrow working pressure chamber 1122. A reaction pressure chamber 1143 is disposed at one of the end faces of the valve-adjusting member 1127 provided in the usual manner with the control edges 1136 and 1137, whereby the reaction pressure chamber 1143 is connected constantly with the valve connection 1130 of the wide working pressure chamber 1121 by way of a bore 1144 of the valve-adjusting member 1127 and the reaction pressure thereof acts upon the reaction pressure surface 1142 of the valve-adjusting member 1127. On its opposite end face, the valve-adjusting member 1127 is provided with a rigid coupling sleeve 1160, into the central bore of which is inserted a coupling pin 1159 of a double-acting reaction-piston 1148 in a pressuretight and displaceable manner. Corresponding to the arrangement of FIG. 10, the coupling pin 1159 includes a rigid cross pin 1162 and the coupling sleeve 1160 is provided with diametrically mutually oppositely disposed radial bores 1161 in order to connect the reaction piston 1148—with respect to which the coupling pin 1159 forms an immovable part—in the already described manner with the valve-adjusting member 1127 so as to provide limited movement. The coupling pin 1159 is constructed in one piece with the one piston section 1157 of the reaction piston 1148 which is guided in a pressure-tight and displaceable manner in the cylinder bore of a cylinder sleeve 1158 and which at the same time abuts at a reaction spring member 1155 subjected to a prestress force as also at a fixed spacer pin 1156 of the other piston section 1147 of the reaction piston 1148. The piston section 1147 is again inserted into the cylinder bore of a pot-shaped cylinder sleeve 1150 and is provided with a reaction relief pressure surface 1146 disposed in the reaction pressure chamber 1152 of the cylinder sleeve 1150. The reaction pressure chamber 1152 is in communication by way of a radial bore 1153 of the cylinder sleeve 1150 and by way of a communicating housing channel 1154 with the wide working pressure chamber 1121. The ring-shaped reaction pressure chamber 1170 between the valve-adjusting member 1127 and the piston section 1157 is connected by way of a radial groove 1187 in the end face of the cylinder sleeve 1158 and by way of a communicating housing channel 1171 with the narrow working pressure chamber 1122 and with the storage pressure line 1133. The effective cross section of the reaction pressure surface 1168 of the valve-adjusting member 1127 acted upon by the reaction pressure in the reaction pressure chamber 1170 and of the reaction relief pressure surface 1169 of the piston section 1157 is respectively equal to the annular cross section of the coupling sleeve 1160. The free end surface of the coupling pin 1159 is disposed in a pressure-relieved chamber 1200 of the valve adjusting member 1127 which is operatively connected by way of a bore 1201 of the valve-adjusting member 1127 and the communicating through-aperture 1124 of the steering gear housing 1102 for the control bar 1128 with interior space 1122c of the steering gear housing 1102 which in its turn is connected by way of a housing channel 1135c with the return line 1135. The enlarged section 1174 of the cylinder bore of the cylinder sleeve 1158 for the accommodation of the reaction spring member 1155 is in communication by way of a radial bore 1175 to the cylinder sleeve 1158 and by way of a communicating housing channel 1176 with the pressure-relieved interior space 1122c of the steering gear housing 1102.

The ratio $i$ of the working pressure surface 1100 acted upon by the control pressure to the working pressure surface 1195 acted upon by the storage pressure is both equal to the ratio of the reaction pressure surface 1142 to the reaction pressure surface 1168 as also equal to the ratio to the reaction relief pressure surface 1146 to the reaction relief pressure surface 1169, and thus also respectively the effective cross section of the reaction pressure surface 1142 and its associated reaction relief pressure surface 1146 are of equal size.

As long as the difference of the two reaction relief pressure forces of the surfaces 1146 and 1169 at the reaction piston 1148 is smaller than the prestress force of the reaction spring member 1155, only the difference of the reaction pressure forces of the surfaces 1142 and 1168 becomes effective at the valve-adjusting member 1127 displaceably guided in the housing bore 1151 of the valve housing 1126. Within this proportionality range of the manual force, during a right-turn deflection of the steering wheel corresponding to the positive directional sense of the directional arrow $M_S$ for the torque of the steering worm 1106 in FIG. 17, the control pressure in the wide working pressure chamber 1121 and therewith the reaction pressure in the reaction pressure chamber 1143 is increased so that a difference of the reaction pressure forces of the surfaces 1142 and 1168 which is oppositely directed to its movement in the direction of the steering shaft 1115 (during the right turn deflection) becomes effective at the valve-adjusting member 1127. The corresponding progress of the manual force at the steering wheel for the right-hand deflection is indicated in FIG. 18 by the curve section 1145. Since in the reaction piston 1148 the respective reaction relief pressure surface is equal to its associated reaction pressure surface, the reaction forces resulting from the reaction pressure and the reaction relief pressure forces mutually equalize and cancel out one another within the range of the manual force limitation (curve section 1149 in FIG. 18) in which the difference of the reaction relief pressure forces of the surfaces 1146 and 1169 at the reaction piston 1148 is larger than the prestress force of the reaction spring member 1155 and therewith the valve adjusting member 1127 is rigidly connected with the reaction piston 1148, so that exclusively the spring constant of the reaction spring member 1155 enters into the characteristics of the curve section 1149 as increase for the manual force as a function of the steering wheel deflection.

In the embodiment according to FIGS. 16 and 17 of the control valve 1125 according to the present invention, in addition to the possibility to exchange the direction of rotation of the steering shaft 1115 with respect to the direction of rotation of the steering shaft in the remaining embodiments, it is additionally advantageous that the coupling pin 1159 is utilized for the formation of the smaller reaction pressure surface 1168 of the valve-adjusting member 1127 so that the reaction piston additionally necessary for this purpose in the other embodiments of the servo-steering mechanism with two-edge control is economized.

The eighth embodiment in FIGS. 19 and 20 of the control valve according to the present invention differs from the embodiment shown in FIGS. 16 to 18 exclusively by a different ratio of the reaction pressure surface to the reaction relief pressure surface. For the designation in the following description of the eighth embodiment, the corresponding reference numerals are again increased respectively by 1,000 compared to the reference numerals of the corresponding parts of the embodiment of FIGS. 16 to 18 so that reference numerals of the 2,000 series are used. This description will concern itself only with the differing features whereas as to the rest the description referring to FIGS. 16 to 18 of the seventh embodiment of the control valve according to the present invention is applicable to the eighth embodiment of FIGS. 19 and 20.

In the servo-steering mechanism of FIG. 19, the valve housing 2126 which is in one piece with the steering gear housing 2102, is provided with the three valve connections 2130, 2131 and 2134 for the wide working pressure chamber (1121 in FIG. 17), for the narrow working pressure chamber (1122 in FIG. 17) and the storage pressure line 2133, and for the return line 2135, respectively. These valve connections are valved in the usual manner by the two control edges 2136 and 2137 of the valve-adjusting member 2127.

The housing bore 2151 for the valve-adjusting member 2127 is provided with reaction pressure chambers 2143 and 2170 disposed on the end faces of the latter, of which the former is connected with the valve connection 2130 of the wide working pressure chamber and the latter with a housing channel 2171 connected with the narrow working pressure chamber and the storage pressure line 2133. The ratio of the reaction pressure surface 2142 of the valve-adjusting member 2127 which is disposed in the reaction pressure chamber 2143, to the reaction pressure surface 2168 of the valve-adjusting member 2127 which is disposed in the reaction pressure chamber 2170 is equal to the ratio $i$ of the working pressure surfaces of the working piston. This is also true again for the ratio of the reaction relief pressure surfaces 2146 and 2169 of the two piston sections 2147 and 2157 of the double-acting reaction piston 2148 which are supported at the reaction spring member 2155.

Since the effective diameter $d_4$ of the reaction relief pressure surface 2146 is smaller than the effective diameter $d_1$ of the associate reaction pressure surface 2142 (and therewith also the effective annular cross section of the reaction relief pressure surface 2169 is smaller than the effective annular cross sections of the associated reaction pressure surface 2168), a more steep curve 2149b of the manual force compared to the curve section 1149 in FIG. 18 will result for the range of the manual force limitation adjoining the proportionality range 2145 in FIG. 20 because after overcoming the prestress force of the reaction spring member 2155, the reaction pressure force difference at the valve-adjusting member 2127 is not completely cancelled out by the reaction relief pressure force difference at the reaction piston 2148.

In the following will be mentioned some of the advantages of the present invention in relation to the individual embodiments of the control valve according to the present invention.

Figure 7:
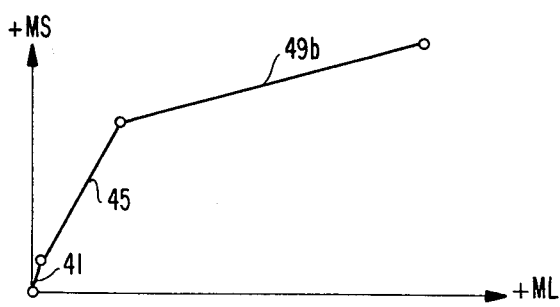
FIG. 7 is a diagram illustrating the curve of the steering moment $M_S$ at the steering worm as a function of the steering shaft moment $M_L$ in the third embodiment of the control valve according to the present invention as illustrated in FIG. 6.

As can be seen in particular from FIG. 6, a reaction relief pressure surface 69b is located in a reaction pressure chamber 70b of the valve housing 26b in order to be able to change the ratio of the reaction relief pressure surface 69b to the associated reaction pressure surface 68b for purposes of achieving the different characteristics 49 in FIG. 3 and 49a in FIG. 5 or 49b in FIG. 7 without making necessary a change of the reaction pressure surface 68b at the valve adjusting member 27b. As a result thereof, the reaction pressure surfaces 68b and 42b of the valve adjusting member 27b can be adjusted or matched in each case to the ratio $i$ of the working pressure surfaces of the working piston in order to obtain a curve (45 and 72 in FIG. 3) of the manual force within the proportionality range which is symmetrical for the left-hand and right-hand deflection.

The expenditure in reaction pressure chambers and associated pressure medium-connections is slight if—as can be seen again in particular from FIG. 6—the reaction relief pressure surface 69b and the associated reaction pressure surface 68b are disposed in a common reaction pressure chamber 70b of the valve housing 26b.

An advantage of separate reaction pressure chambers 43 and 52 or 52a for the reaction pressure surface 42 and the associated reaction relief pressure surface 46 or 46a can be recognized in particular from FIGS. 1 and 4. One end of the valve adjusting member 27 is without reaction piston and can therefore be located very close to the steering shaft 15 for achieving a compact steering gear housing.

A further advantage of the separate reaction pressure chambers for the reaction relief pressure surface and the associated reaction pressure surface is recognizable also in particular from FIGS. 1 to 4, and more particularly it is possible in this manner to permit one reaction relief pressure surface influenced by the working pressure of the one working pressure chamber and one reaction relief pressure surface influenced by the working pressure of the other working pressure chamber to work against one another in order to thus create a measuring and indicating device for the difference of the two pressure forces at the two working pressure surfaces which act externally at the working piston, which may serve as repeat or check-back installation of this difference at the steering wheel and is independent of the control principle of the control valve, i.e., is independent of the fact whether the control valve operates with two or four control edges.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A control valve for a pressure medium operated servo-motor of a servo-steering mechanism of the type having working pressure chamber means at respective oppositely directed working surfaces of relatively movable piston-cylinder means; said control valve comprising:

valve housing means, valve adjusting means movably disposed in said valve housing means for controlling fluid pressure supply to said working pressure chamber means, said valve adjusting means being disposed to be acted upon by load dependent reaction pressure of said working chamber means in a direction opposite the direction of movement of said valve adjusting means from a neutral position, double action reaction piston means, said reaction piston means having two oppositely acting reaction relief pressure surface means, prestressed reaction spring means supporting said reaction piston means in both respective opposite axial directions with respect to said valve housing means, and reaction piston connecting means connecting said reaction piston means with limited movement with said valve adjusting means while enabling a limited free relative adjusting path between said valve adjusting means and said reaction piston means, wherein said reaction relief pressure surface means is acted on by said reaction pressure forcing said reaction piston means in a direction reducing the effect of said reaction pressure on said valve adjusting means, whereby increase of said reaction pressure above a predetermined value results in movement of said reaction piston means against said reaction spring means to engage said connecting means and apply forces to said valve adjusting means in the direction of movement of said valve adjusting means.

2. A control valve according to claim 1, wherein the reaction piston means includes two separate reaction piston sections, each of said reaction piston sections having a reaction relieving pressure surface means.

3. A control valve according to claim 1, wherein said valve housing means and said valve adjusting member are configured with two edge control means for controlling the fluid pressure supply to said working pressure chamber means, one of said working pressure chamber means being at constant pressure and the other of said working pressure chamber means having variable pressure as controlled by said two edge control means.

4. A control valve according to claim 3, wherein said valve adjusting means includes reaction pressure surface means acted upon by the fluid pressure in said working pressure chamber means, and
    wherein one of said reaction relief pressure surface means is disposed in a common reaction pressure chamber with a reaction pressure surface means of said valve adjusting member.

5. A control valve according to claim 4, wherein said common reaction pressure chamber is at the pressure of said working pressure chamber means having variable pressure.

6. A control valve according to claim 4, wherein said common reaction pressure chamber is at the pressure of said working pressure chamber means having constant pressure.

7. A control valve according to claim 1, wherein said valve adjusting means includes reaction pressure surface means acted upon by the fluid pressure in said working pressure chamber means, and
    wherein one of said reaction relief pressure surface means is disposed in a common reaction pressure chamber with said reaction pressure surface means of said valve adjusting member.

8. A control valve according to claim 7, with a two-edge control of the control pressure in a relatively wide working pressure chamber means of the servo-motor having a differential working piston means whose relatively narrow working pressure chamber means is subjected to an essentially constant pressure, characterized in that the ratio of the reaction pressure surface means of the valve-adjusting means is equal to the ratio of the working pressure surface means of the differential working piston means.

9. A control valve according to claim 8, characterized in that the ratio of the reaction relief pressure surface means is substantially equal to the ratio of the working pressure surface means of the differential working piston means.

10. A control valve according to claim 8, characterized in that the common reaction pressure chamber means for the valve-adjusting means and the double-acting reaction piston means is operatively connected with the wide working pressure chamber means.

11. A control valve according to claim 8, characterized in that the common reaction pressure chamber means for the valve-adjusting means and the double-acting reaction piston means is operatively connected to the narrow working pressure chamber means, and in that a connecting bolt means extends through said last-mentioned common reaction pressure chamber means, the cross section of the connecting bolt means being smaller than the cross section of the common reaction pressure chamber means.

12. A control valve according to claim 11, characterized in that the connecting bolt means is operatively connected in a substantially pressure-tight manner with the double-acting reaction piston means so as to be relatively immovable with respect thereto whereas it is operatively connected in a substantially pressure-tight manner with the valve-adjusting means so as to be movable within limits with respect thereto.

13. A control valve according to claim 7, characterized in that the reaction pressure surface means of the valve-adjusting means is immovable relative to the valve-adjusting means.

14. A control valve according to claim 13, in which the valve-adjusting means is provided with a second reaction pressure surface means immovable relative thereto, which is disposed in a reaction pressure chamber means connected exclusively to the other working pressure chamber means and is directed opposite to the first-mentioned reaction pressure surface means.

15. A control valve according to claim 14, characterized in that the axis of the double-acting reaction piston means is arranged coaxially to the axis of the valve-adjusting means.

16. A control valve according to claim 14, characterized in that the double-acting reaction piston means includes two structurally separate piston sections adapted to be axially supported against one another, and each piston section is provided with a reaction relief pressure surface means.

17. A control valve according to claim 14, characterized in that a pressure-relieved housing chamber means is provided between the reaction pressure chamber means of the one reaction relief pressure surface means and the reaction pressure chamber means of the other reaction relief pressure surface means, the prestressed reaction spring means for the housing support of the double-acting reaction piston means being arranged in the housing chamber means.

18. A control valve according to claim 17, characterized in that the pressure-relieved housing chamber means includes two spring abutment means disposed at an axial spacing to one another, one spring end each of an axially compressible compression spring means being supportable at each of said spring abutment means, and in that the one piston section abuts at the one spring end and the other piston section at the other spring end.

19. A control valve according to claim 1, characterized in that one of the reaction relief pressure surface means is arranged in one reaction pressure chamber means connected to one of the two working pressure chamber means and the other reaction relief pressure surface means is arranged in a reaction pressure chamber means connected to the other of the two working pressure chamber means, at least the reaction pressure chamber means of the one reaction relief pressure surface means forming a part of the valve housing means.

20. A control valve according to claim 19, characterized in that the axis of the double-acting reaction piston means is arranged coaxially to the axis of the valve-adjusting means.

21. A control valve according to claim 19 wherein said valve adjusting means includes two oppositely facing reaction pressure surface means communicating with said reaction pressure, wherein one of said reaction relief pressure surface means is adjacent the valve adjusting means, and wherein one of the reaction pressure surface means is adjacent the double-acting reaction piston means, characterized in that the reaction relief pressure surface means adjacent the valve-adjusting means and the reaction pressure surface means adjacent the double-acting reaction piston means are disposed in a common reaction pressure chamber means connected to one of said working pressure chamber means.

22. A control valve according to claim 21, characterized in that the common reaction pressure chamber means is a part of the valve-adjusting means.

23. A control valve according to claim 21, characterized in that a reaction relief pressure surface means opposite the valve-adjusting means and a reaction pressure surface means opposite the double-acting reaction piston means are arranged in separate reaction pressure chamber means connected respectively to the other working pressure chamber means, of which at least the reaction pressure chamber means of the last-mentioned reaction relief pressure surface means is a part of the valve housing means.

24. A control valve according to claim 23, characterized in that the common reaction pressure chamber means is a part of the valve-adjusting means.

25. A control valve according to claim 23, with a housing control chamber means characterized in that the common reaction pressure means is a section of the housing control chamber means for the valve-adjusting means.

26. A control valve according to claim 25, characterized in that the section of the housing control chamber means is formed by a housing bore for the valve-adjusting means.

27. A control valve according to claim 23, with a two-edge control of the control pressure in a relatively wide working pressure chamber means of a servo-motor having a differential working piston means whose relatively narrow working pressure chamber means is subjected to an essentially constant pressure, characterized in that the ratio of the reaction pressure surface means of the valve-adjusting means is equal to the ratio of the working pressure surface means of the differential working piston means.

28. A control valve according to claim 27, characterized in that the essentially constant pressure is a storage pressure.

29. A control valve according to claim 27, characterized in that the ratio of the reaction relief pressure surface means is substantially equal to the ratio of the working pressure surface means of the differential working piston means.

30. A control valve according to claim 29, characterized in that the common reaction pressure chamber means for the valve-adjusting means and the double-acting reaction piston means is operatively connected with the wide working pressure chamber means.

31. A control valve according to claim 29, characterized in that the common reaction pressure chamber means for the valve-adjusting means and the double-acting reaction piston means is operatively connected to the narrow working pressure chamber means, and in that a connecting bolt means extends through said last-mentioned common reaction pressure chamber means, the cross section of the connecting bolt means being smaller than the cross section of the common reaction pressure chamber means.

32. A control valve according to claim 31, characterized in that the connecting bolt means is operatively connected substantially in a pressure-tight manner with the double-acting reaction piston means so as to be relatively immovable with respect thereto whereas it is operatively connected in a substantially pressure-tight manner with the valve-adjusting means so as to be movable within limits with respect thereto.

33. A control valve according to claim 32, characterized in that the double-acting reaction piston means includes two structurally separate piston sections adapted to be axially supported against one another, and each piston section is provided with a reaction relief pressure surface means.

34. A control valve according to claim 33, characterized in that a pressure relieved housing chamber means is provided between the reaction pressure chamber means of the one reaction relief pressure surface means and the reaction pressure chamber means of the other reaction relief pressure surface means, the prestressed reaction spring means for the housing support of the double-acting reaction piston means being arranged in the housing chamber means.

35. A control valve according to claim 34, characterized in that the pressure-relieved housing chamber means includes two spring abutment means disposed at an axial spacing to one another, one spring end each of an axially compressible compression spring means being supportable at each of said spring abutment means, and in that the one piston section abuts at the one spring end and the other piston section at the other spring end.

36. A control valve according to claim 35, characterized in that the reaction pressure surface means and its associated reaction relief pressure surface means are disposed in a common reaction pressure chamber means of the valve housing means.

37. A control valve according to claim 36, characterized in that the reaction pressure surface means and its associated reaction relief pressure surface means are disposed in different reaction pressure chamber means.

38. A control valve according to claim 35, characterized in that the ratio of the reaction pressure surface means to the reaction relief pressure surface means is other than 1.

39. A control valve according to claim 7, characterized in that the ratio of the reaction pressure surface means to the reaction relief pressure surface means is other than 1.

40. A control valve according to claim 7, characterized in that a common reaction pressure chamber means is formed inside of the valve housing means.

41. A control valve according to claim 7, characterized in that at least one of the reaction pressure surface means and its associated reaction relief pressure surface means are disposed in different reaction pressure chamber means.

42. A control valve according to claim 7, wherein the other of said reaction relieving pressure surface means is disposed in a reaction pressure chamber of the valve housing means.

43. A control valve according to claim 7, wherein the common reaction pressure chamber is disposed in the valve housing means.

44. A control valve according to claim 7, wherein the common reaction pressure chamber is disposed inside of the valve adjusting means.

45. A control valve according to claim 7, wherein the reaction piston means includes two separate reaction piston sections, each of said reaction piston sections having a reaction relieving pressure surface means.

46. A control valve according to claim 7, further comprising base spring means for holding said valve adjusting means in a neutral position with predetermined forces.

47. A control valve according to claim 7, wherein said reaction piston connecting means includes a lost motion pin and slot connection.

* * * * *